(12) United States Patent
Yoshida et al.

(10) Patent No.: US 8,947,476 B2
(45) Date of Patent: Feb. 3, 2015

(54) LIQUID-CRYSTAL DISPLAY AND SIGNAL CONVERTING CIRCUIT

(75) Inventors: Yuichi Yoshida, Osaka (JP); Kazunari Tomizawa, Osaka (JP); Tomohiko Mori, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 144 days.

(21) Appl. No.: 13/520,243

(22) PCT Filed: Jan. 6, 2011

(86) PCT No.: PCT/JP2011/050071
§ 371 (c)(1),
(2), (4) Date: Jul. 2, 2012

(87) PCT Pub. No.: WO2011/083808
PCT Pub. Date: Jul. 14, 2011

(65) Prior Publication Data
US 2012/0281033 A1 Nov. 8, 2012

(30) Foreign Application Priority Data
Jan. 7, 2010 (JP) ................. 2010-002378

(51) Int. Cl.
*G09G 5/02* (2006.01)
*G09G 5/00* (2006.01)
(Continued)

(52) U.S. Cl.
CPC .......... *G09G 3/3648* (2013.01); *G02F 2201/52* (2013.01); *G09G 2300/0452* (2013.01);
(Continued)

(58) Field of Classification Search
CPC . G09G 2340/06; G09G 3/3607; G09G 3/364; H04N 3/127

USPC ........ 345/77, 88, 89, 589, 590, 613, 690, 694
See application file for complete search history.

(56) References Cited

U.S. PATENT DOCUMENTS 4,800,375 A  1/1989  Silverstein et al.
5,774,101 A *  6/1998  Hirai et al. ...................... 345/89
(Continued)

FOREIGN PATENT DOCUMENTS

JP  09-251160 A  9/1997
JP  2001-209047 A  8/2001
(Continued)

OTHER PUBLICATIONS

Senfar Wen. Design of relative primary luminances for four-primary displays. Jul. 26, 2005. Displays 26 (2005) 171-176. DOI: 10.1016/j.displa.2005.06.04.*

(Continued)

*Primary Examiner* — Dwayne Bost
*Assistant Examiner* — Stefan M Oehrlein
(74) *Attorney, Agent, or Firm* — Keating & Bennett, LLP

(57) ABSTRACT

A liquid crystal display device includes a liquid crystal display panel and a driving circuit that supplies display signals to a plurality of subpixels of the liquid crystal display panel. The plurality of subpixels are a red subpixel, a green subpixel, a blue subpixel, and a yellow subpixel. When achromatic colors of at least some gray levels among all gray levels are to be displayed by the pixel, display signals which are supplied to a first subpixel group composed of certain two subpixels are display signals of the same grayscale level, whereas display signals which are supplied to a second subpixel group composed of the other two subpixels are display signals of a different grayscale level from the grayscale level of the display signals supplied to the first subpixel group. The first subpixel group includes the yellow subpixel, and the second subpixel group includes the blue subpixel.

11 Claims, 13 Drawing Sheets

(51) Int. Cl.
*G09G 3/36* (2006.01)
*G09G 3/20* (2006.01)

(52) U.S. Cl.
CPC .............. *G09G2320/0242* (2013.01); *G09G 2320/0666* (2013.01); *G09G 2340/06* (2013.01); *G09G 3/2074* (2013.01); *G09G 5/026* (2013.01)
USPC .............. 345/694; 345/88; 345/89; 345/613; 345/690

(56) References Cited

U.S. PATENT DOCUMENTS

| | | |
|---|---|---|
| 6,862,012 B1 * | 3/2005 | Funakoshi et al. ............ 345/88 |
| 2004/0174389 A1 | 9/2004 | Ben-David et al. |
| 2005/0122294 A1 | 6/2005 | Ben-David et al. |
| 2005/0206979 A1 | 9/2005 | Tomizawa et al. |
| 2009/0115952 A1 | 5/2009 | Nakamura et al. |
| 2009/0273607 A1 * | 11/2009 | Ueki et al. ................ 345/590 |
| 2010/0091032 A1 * | 4/2010 | Ueki et al. ................ 345/590 |
| 2010/0277500 A1 | 11/2010 | Otsuka et al. |
| 2011/0080520 A1 | 4/2011 | Tomizawa et al. |
| 2012/0001963 A1 * | 1/2012 | Hinnen et al. ............. 345/690 |

FOREIGN PATENT DOCUMENTS

| | | |
|---|---|---|
| JP | 02001209047 A * | 8/2001 |
| JP | 2001-306023 A | 11/2001 |
| JP | 2005-303989 A | 10/2005 |
| JP | 2005-328386 A | 11/2005 |
| WO | 2007/039957 A1 | 4/2007 |
| WO | 2007/148519 A1 | 12/2007 |
| WO | 2008/038568 A1 | 4/2008 |
| WO | WO 2008038568 A1 * | 4/2008 |
| WO | 2009/044827 A1 | 4/2009 |
| WO | 2009/144896 A1 | 12/2009 |

OTHER PUBLICATIONS

Wen, "Design of Relative Primary Luminances for Four-Primary Displays," Displays Devices, Dempa Publications, vol. 26, No. 4-5, Oct. 1, 2005. pp. 171-176.

Official Communication issued in International Patent Application No. PCT/JP2011/050071, mailed on Feb. 8, 2011.

Yang et al.; "31.1: Development of Six Primary-Color LCD"; Society for Information Display, 2005 International Symposium Digest of Technical Papers; vol. XXXVI, Book II; May 25-27, 2005; pp. 1210-1213.

Chino et al.; "25.1: Invited Paper: Development of Wide-Color-Gamut Mobile Displays With Four-Primary-Color LCDS"; Society for Information Display, 2006 International Symposium Digest of Technical Papers; vol. XXXVII, Book II; Jun. 7-9, 2006; pp. 1221-1224.

Ben-Chorin; "Improving LCD TV Color Using Multi-Primary Technology"; FPD International 2005 Forum; Oct. 19, 2005; Total of 66 pages.

English translation of Official Communication issued in corresponding International Application PCT/JP2011/050071, mailed on Aug. 16, 2012.

* cited by examiner

LIQUID-CRYSTAL DISPLAY AND SIGNAL CONVERTING CIRCUIT

TECHNICAL FIELD

The present invention relates to a liquid crystal display device, and more particularly to a multiprimary liquid crystal display device which performs multicolor display by using four primary colors.

BACKGROUND ART

Currently, liquid crystal display devices are used in a variety of applications. In commonly-used liquid crystal display devices, each pixel is composed of three subpixels for displaying three primaries of light, i.e., red, green and blue, whereby multicolor display is achieved.

However, conventional liquid crystal display devices have a problem in that they can only display colors in a narrow range (referred to as a "color gamut"). Therefore, in order to broaden the color gamut of a liquid crystal display device, there has been proposed a technique which increases the number of primary colors to be used for displaying.

For example, Patent Document 1 discloses a liquid crystal display device each of whose pixel is composed of four subpixels, i.e., a red subpixel for displaying red, a green subpixel for displaying green, and a blue subpixel for displaying blue, as well as a yellow subpixel for displaying yellow. This liquid crystal display device performs multicolor display by mixing the four primary colors of red, green, blue, and yellow, which are displayed by the four subpixels.

By performing display by using four or more primary colors, the color gamut can be made broader than in the case of conventional liquid crystal display devices that use three primaries for displaying. In the present specification, liquid crystal display devices which perform display by using four or more primary colors will be referred to as "multiprimary liquid crystal display devices", and liquid crystal display devices which perform display by using three primaries will be referred to as "three-primary liquid crystal display devices".

CITATION LIST

Patent Literature

[Patent Document 1] International Publication No. 2007/148519
[Patent Document 2] Japanese Laid-Open Patent Publication No. 2005-328386

SUMMARY OF INVENTION

Technical Problem

Multiprimary liquid crystal display devices pertain to a recently-proposed technique, and no technique of white point adjustment therefore has been established yet. White point adjustment means a gamma adjustment, which is applied independently to each primary color, for ensuring that a chromaticity point when displaying an achromatic color of an intermediate gray level (i.e., gray) matches the chromaticity point of an achromatic color of the highest grayscale level (i.e., white). Generally speaking, an achromatic color of the highest grayscale level is displayed by allowing all subpixels composing one pixel to be lit at the highest grayscale level (i.e., at the same grayscale level). However, when displaying an achromatic color of an intermediate gray level, even if all subpixels are lit at the same grayscale level that is the grayscale level of the achromatic color which is to be displayed, the chromaticity point of an achromatic color which is actually displayed by that pixel may often deviate from the chromaticity point of the achromatic color of the highest grayscale level. White point adjustment is applied in order to reduce such deviation.

As a technique of white point adjustment for a three-primary liquid crystal display device, Patent Document 2 discloses a method which, while fixing the grayscale level of green, which has the highest luminance among the three primaries (i.e., predominant in luminance), changes (increases or decreases) the grayscale levels of the other two colors of red and blue, thus to ensure that the chromaticity point of an achromatic color at each grayscale level matches the target, i.e., the chromaticity point of an achromatic color of the highest grayscale level.

However, in multiprimary liquid crystal display devices, there is an increased number of primary colors that are used for displaying (i.e., an increased freedom in applying white point adjustment), and therefore the white point adjustment technique for three-primary liquid crystal display devices is not straightforwardly applicable.

The present invention has been made in view of the aforementioned problems, and an objective thereof is to provide a white point adjustment technique which is suitably used for a multiprimary liquid crystal display device that performs multicolor display by using four primary colors.

Solution to Problem

A liquid crystal display device according to the present invention is a liquid crystal display device comprising: a liquid crystal display panel having a pixel defined by a plurality of subpixels; and a driving circuit that supplies display signals to the plurality of subpixels of the liquid crystal display panel, wherein the plurality of subpixels are a red subpixel to display red, a green subpixel to display green, a blue subpixel to display blue, and a yellow subpixel to display yellow; when achromatic colors of at least some gray levels among all gray levels are to be displayed by the pixel, display signals which are supplied from the driving circuit to a first subpixel group composed of two subpixels among the red subpixel, the green subpixel, the blue subpixel, and the yellow subpixel are display signals of a same grayscale level, and display signals which are supplied from the driving circuit to a second subpixel group composed of other two subpixels among the red subpixel, the green subpixel, the blue subpixel, and the yellow subpixel are display signals of a different grayscale level from the grayscale level of the display signals supplied to the first subpixel group; the first subpixel group includes the yellow subpixel; and the second subpixel group includes the blue subpixel.

In a preferred embodiment, the at least some gray levels are intermediate gray levels of 60% or more among all gray levels.

In a preferred embodiment, the at least some gray levels do not include any intermediate gray levels corresponding to a normalized luminance of 0.2 or less.

In a preferred embodiment, the first subpixel group further includes the red subpixel; and the second subpixel group further includes the green subpixel.

In a preferred embodiment, when the achromatic colors of the at least some gray levels are to be displayed by the pixel, the display signal supplied from the driving circuit to the blue subpixel is a display signal of a lower grayscale level than the grayscale level of the display signals supplied to the yellow subpixel and the red subpixel, and the display signal supplied from the driving circuit to the green subpixel is a display signal of a higher grayscale level than the grayscale level of the display signals supplied to the yellow subpixel and the red subpixel.

In a preferred embodiment, the first subpixel group further includes the green subpixel; and the second subpixel group further includes the red subpixel.

In a preferred embodiment, when the achromatic colors of the at least some gray levels are to be displayed by the pixel, the display signal supplied from the driving circuit to the blue subpixel is a display signal of a lower grayscale level than the grayscale level of the display signals supplied to the yellow subpixel and the green subpixel, and the display signal supplied from the driving circuit to the red subpixel is a display signal of a higher grayscale level than the grayscale level of the display signals supplied to the yellow subpixel and the green subpixel.

In a preferred embodiment, with respect to an achromatic color of a given intermediate gray level among the at least some gray levels being displayed by the pixel, xy chromaticity coordinates of an achromatic color displayed by the pixel when assuming that display signals of the same grayscale level as the given intermediate gray level are supplied to all of the plurality of subpixels is defined as a reference chromaticity point; xy chromaticity coordinates of an achromatic color of a highest grayscale level displayed by the pixel is defined as a target chromaticity point; and a locus of the reference chromaticity point on an xy chromaticity diagram when the grayscale level of the display signal supplied to the blue subpixel is increased or decreased is defined as a B axis; when the target chromaticity point is located above the B axis on the xy chromaticity diagram, the first subpixel group further includes the red subpixel, the second subpixel group further includes the green subpixel, the display signal supplied from the driving circuit to the blue subpixel is a display signal of a lower grayscale level than the grayscale level of the display signals supplied to the yellow subpixel and the red subpixel, and the display signal supplied from the driving circuit to the green subpixel is a display signal of a higher grayscale level than the grayscale level of the display signals supplied to the yellow subpixel and the red subpixel; and when the target chromaticity point is located below the B axis on the xy chromaticity diagram, the first subpixel group further includes the green subpixel, the second subpixel group further includes the red subpixel, the display signal supplied from the driving circuit to the blue subpixel is a display signal of a lower grayscale level than the grayscale level of the display signals supplied to the yellow subpixel and the green subpixel, and the display signal supplied from the driving circuit to the red subpixel is a display signal of a higher grayscale level than the grayscale level of the display signals supplied to the yellow subpixel and the green subpixel.

In a preferred embodiment, the display signals supplied from the driving circuit to the first subpixel group are display signals of the same grayscale level as the grayscale level of an achromatic color displayed by the pixel.

In a preferred embodiment, the liquid crystal display panel includes a plurality of scanning lines and a plurality of signal lines; and the driving circuit includes a gate driver electrically connected to the plurality of scanning lines, a source driver electrically connected to the plurality of signal lines, and a timing controller that supplies predetermined signals to the gate driver and the source driver.

In a preferred embodiment, the timing controller includes a signal conversion circuit that converts an image signal corresponding to three primary colors into a multiprimary signal corresponding to four primary colors.

In a preferred embodiment, the timing controller further includes a test circuit to conduct a white point adjustment.

A signal conversion circuit according to the present invention is a signal conversion circuit for use in a liquid crystal display device for converting an image signal corresponding to three primary colors into a multiprimary signal corresponding to four primary colors, the liquid crystal display device having a pixel which is defined by a red subpixel, a green subpixel, a blue subpixel, and a yellow subpixel, wherein, the signal conversion circuit converts the image signal so that, when achromatic colors of at least some gray levels among all gray levels are to be displayed by the pixel, a first subpixel group composed of two subpixels among the red subpixel, the green subpixel, the blue subpixel, and the yellow subpixel perform display at a same grayscale level, and that a second subpixel group composed of other two subpixels perform display at a different grayscale level from that of the first subpixel group; the first subpixel group includes the yellow subpixel; and the second subpixel group includes the blue subpixel.

Advantageous Effects of Invention

According to the present invention, a white point adjustment technique which is suitably used for a multiprimary liquid crystal display device that performs multicolor display by using four primary colors is provided.

DESCRIPTION OF EMBODIMENTS

Hereinafter, embodiments of the present invention will be described with reference to the drawings. Note that the present invention is not limited to the following embodiments.

Figure 1:
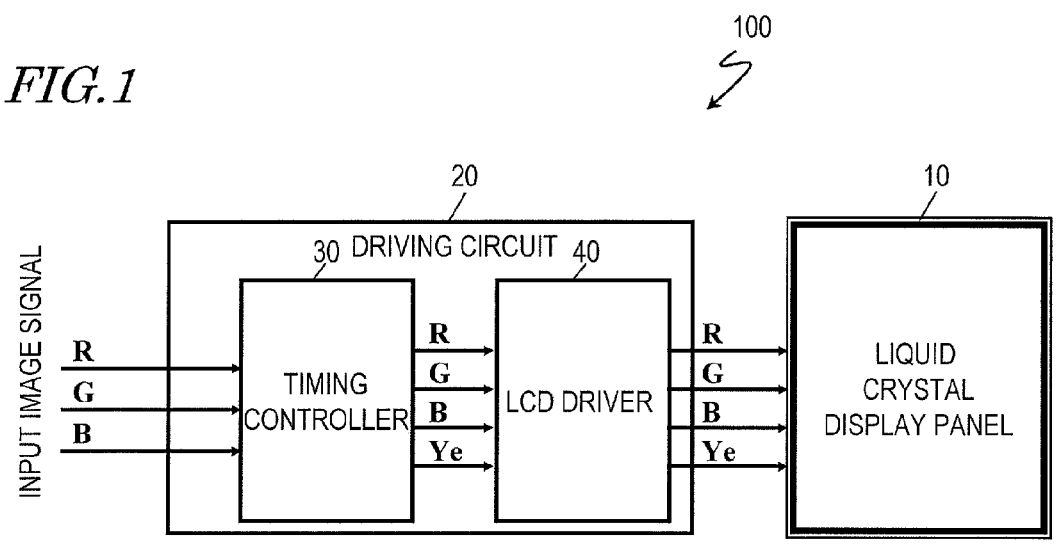
[FIG. 1] A block diagram schematically showing a liquid crystal display device 100 according to a preferred embodiment of the present invention.

FIG. 1 shows a liquid crystal display device 100 according to the present embodiment. As shown in FIG. 1, the liquid crystal display device 100 is a multiprimary liquid crystal display device which includes a liquid crystal display panel 10 and a driving circuit 20, and which performs multicolor display by using four primary colors.

Figure 2:
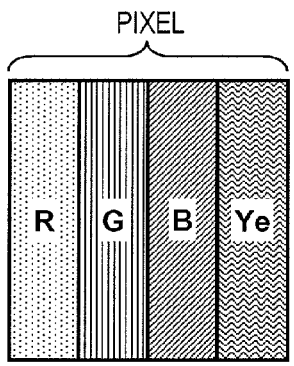
[FIG. 2] A diagram showing an exemplary pixel construction of the liquid crystal display device 100.

The liquid crystal display panel 10 includes a plurality of pixels arranged in a matrix array. Each pixel is defined by a plurality of subpixels. FIG. 2 shows an exemplary pixel construction of the liquid crystal display panel 10. In the example shown in FIG. 2, the plurality of subpixels defining one pixel are a red subpixel R to display red, a green subpixel G to display green, a blue subpixel B to display blue, and a yellow subpixel Ye to display yellow.

Although FIG. 2 illustrates an example where the red subpixel R, green subpixel G, blue subpixel B, and yellow subpixel Ye are disposed in this order from the left side in the pixel, the arrangement of the plurality of subpixels is not limited thereto. The red subpixel R, green subpixel G, blue subpixel B, and yellow subpixel Ye may be arranged in any order.

Figure 3:
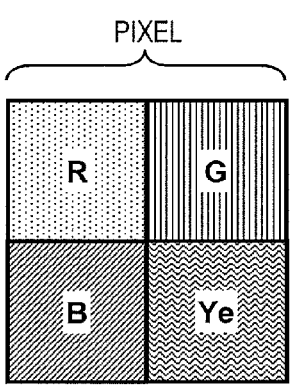
[FIG. 3] A diagram showing an exemplary pixel construction of the liquid crystal display device 100.

Moreover, although FIG. 2 illustrates an example where the plurality of subpixels are in a 1 row×4 column arrangement within the pixel, the arrangement of the plurality of subpixels is not limited thereto. For example, as shown in FIG. 3, the plurality of subpixels may be in a 2 row×2 column arrangement within the pixel.

Based on an externally-input image signal, the driving circuit 20 supplies display signals to the plurality of subpixels of the liquid crystal display panel 10. As shown in FIG. 1, the driving circuit 20 in the present embodiment includes a timing controller 30 for receiving the image signal which is input to the driving circuit 20 and generating a predetermined signal, and an LCD driver 40 for driving the liquid crystal display panel 10 based on the signal which is output from the timing controller 30.

Figure 4:
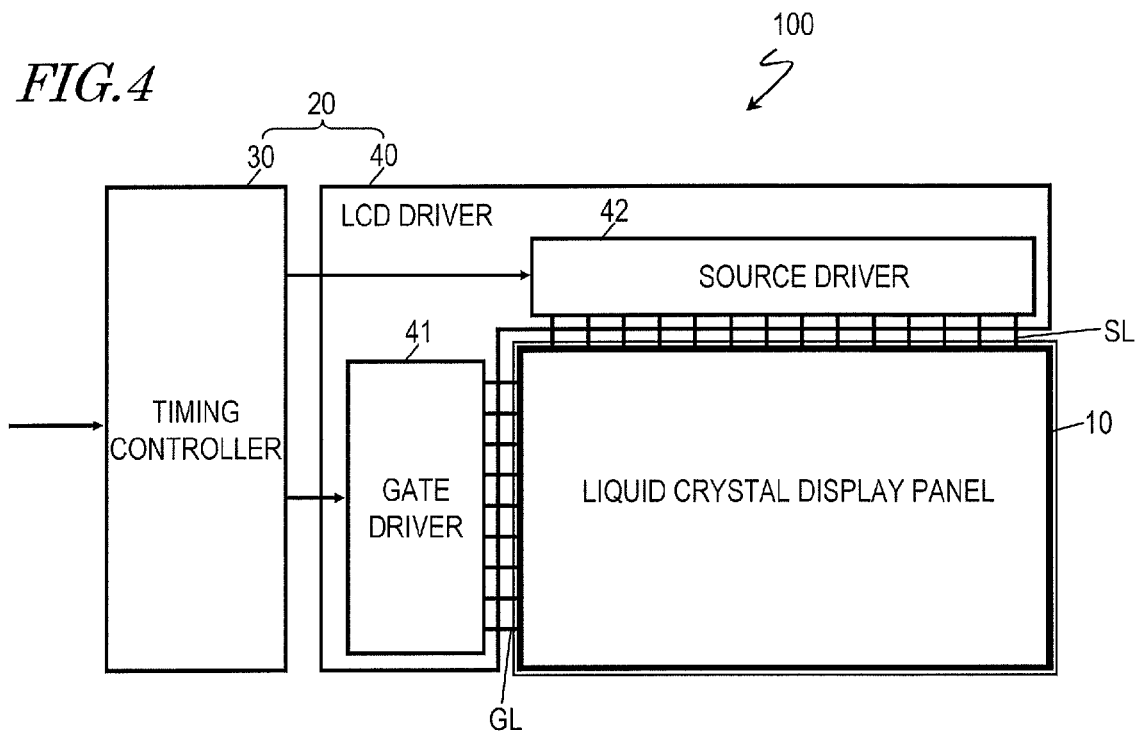
[FIG. 4] A block diagram schematically showing the liquid crystal display device 100 according to a preferred embodiment of the present invention.

As shown in FIG. 4, the LCD driver 40 includes a gate driver 41 which is electrically connected to a plurality of scanning lines GL of the liquid crystal display panel 10 and a source driver 42 which is electrically connected to a plurality of signal lines SL of the liquid crystal display panel 10. Predetermined signals are supplied from the timing controller 30 to the gate driver 41 and the source driver 42.

The present embodiment illustrates an example, as shown in FIG. 1, where an image signal corresponding to three primary colors is externally input to the driving circuit 20. Therefore, the timing controller 30 includes a signal conversion circuit (not shown in FIG. 1 and FIG. 4) that converts the image signal corresponding to three primary colors into a multiprimary signal corresponding to four primary colors. Moreover, the timing controller 30 also includes a test circuit to conduct a white point adjustment (also not shown in FIG. 1 and FIG. 4). The specific construction of the timing controller 30 will be described in detail later.

In the liquid crystal display device 100 of the present embodiment, when achromatic colors of at least some gray levels (i.e., gray) among all gray levels are to be displayed by a pixel, the display signals which are supplied from the driving circuit 20 to a subpixel group composed of two subpixels (referred to as a "first subpixel group") among the four subpixels (red subpixel R, green subpixel G, blue subpixel B, and yellow subpixel Ye) are display signals of the same grayscale level. Specifically, the display signals which are supplied to the first subpixel group from the driving circuit 20 are display signals of the same grayscale level as the grayscale level of an achromatic color which is displayed by the pixel. On the other hand, the display signals which are supplied from the driving circuit 20 to a subpixel group composed of the other two subpixels (referred to as a "second subpixel group") are display signals of a different grayscale level(s) from the grayscale level of the display signals which are supplied to the first subpixel group. The first subpixel group at least includes the yellow subpixel Ye. The second subpixel group at least includes the blue subpixel B.

Thus, in the liquid crystal display device 100 of the present embodiment, for achromatic colors of at least some gray levels, while the grayscale levels of the two subpixels including the yellow subpixel Ye (first subpixel group) are fixed (or more specifically, matched to the grayscale level of an achromatic color which is to be displayed by the pixel), the grayscale levels of the other two subpixels (second subpixel group) including the blue subpixel B are increased or decreased (i.e., made different from the grayscale level of an achromatic color which is to be displayed by the pixel), whereby a white point adjustment is applied.

In the case of applying a white point adjustment for a liquid crystal display device which performs multicolor display by using four primary colors, a technique of independently adjusting the grayscale levels of the four subpixels (i.e., increasing or decreasing the grayscale levels of all subpixels) might be possible, for example; however, such a technique would be very complicated. The present embodiment's technique of fixing the grayscale levels of two colors and adjusting (increasing or decreasing) the grayscale level of the other two colors have common ground with the conventional technique described with reference to Patent Document 2 (a white point adjustment technique for three-primary liquid crystal display devices) in that the grayscale levels of two colors are adjusted, which provides compatibility in terms of the jigs used and the operation procedure, whereby good work efficiency is obtained.

Moreover, in the technique of the present embodiment, the yellow subpixel Ye is included in the first subpixel group, whereas the blue subpixel B is included in the second subpixel group. Thus fixing the grayscale level of the yellow subpixel Ye and increasing or decreasing the grayscale level of the blue subpixel B is preferable for the reasons described below.

In a three-primary liquid crystal display device, as has already been described, green has the highest luminance among the primary colors that are used for displaying. On the other hand, in a liquid crystal display device which performs multicolor display by using four primary colors of red, green, blue, as well as yellow, it is yellow that has the highest luminance. Therefore, by fixing the grayscale level of the yellow subpixel Ye, the influences of white point adjustment on luminance (decrease in luminance) can be reduced.

Table 1 shows exemplary tristimulus values XYZ of the primary colors that are used for displaying by a three-primary liquid crystal display device, i.e., red, green, and blue when the red subpixel, the green subpixel, and the blue subpixel are respectively lit at the maximum grayscale level. Table 2 shows exemplary tristimulus values XYZ of the primary colors that are used for displaying by the liquid crystal display device 100 of the present embodiment, i.e., red, green, blue, and yellow when the red subpixel R, the green subpixel G, the blue subpixel B, and the yellow subpixel Ye are respectively lit at the maximum grayscale level.

TABLE 1

|   | X | Y | Z |
|---|---|---|---|
| R | 0.394324 | 0.208084 | 0.004755 |
| G | 0.343459 | 0.662361 | 0.171251 |
| B | 0.254644 | 0.129554 | 1.385793 |

TABLE 2

|   | X | Y | Z |
|---|---|---|---|
| R | 0.2381 | 0.1253 | 0.0104 |
| G | 0.1453 | 0.3421 | 0.0919 |
| B | 0.2721 | 0.1288 | 1.5043 |
| Ye | 0.2971 | 0.4038 | 0.0147 |

Among the tristimulus values, the Y value represents the luminance (lightness) of each primary color. It can be seen from Table 1 that, in a three-primary liquid crystal display device, the Y value of green is the highest, so that green is predominant in terms of luminance. On the other hand, it can be seen from Table 2 that, in the liquid crystal display device 100, the Y value of yellow is the highest, so that yellow has the highest luminance (lightness).

Thus, from the standpoint of influences on luminance, in the liquid crystal display device 100 performing multicolor display by using four primary colors, it is preferable to fix the grayscale level of the yellow subpixel Ye.

Figure 5:
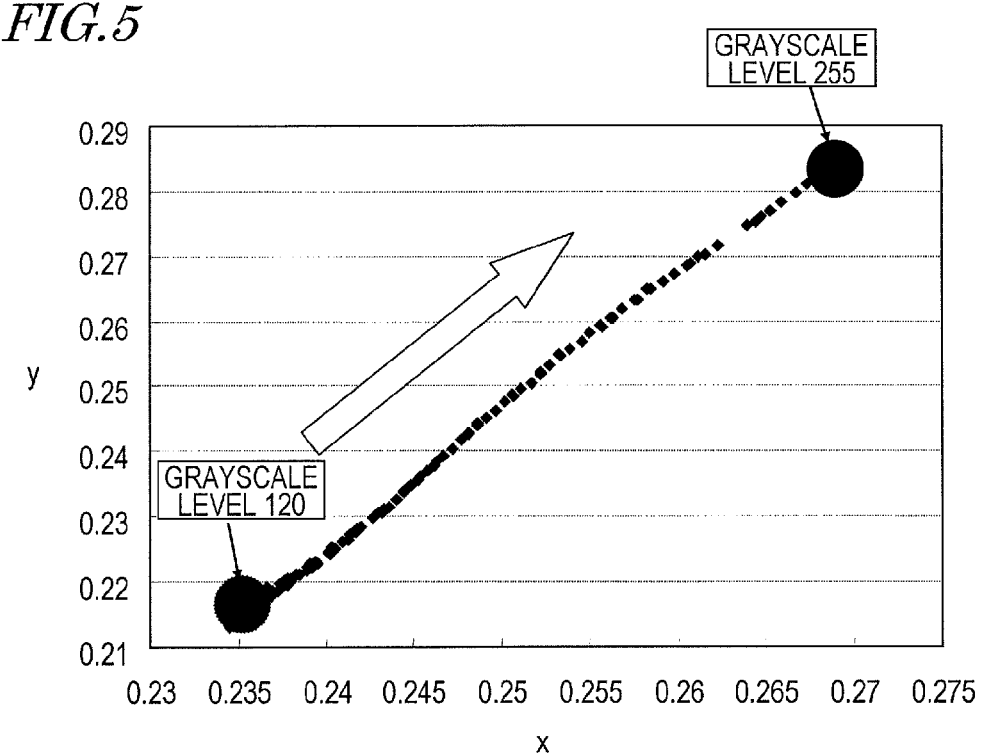
[FIG. 5] An xy chromaticity diagram showing examples of chromaticity points of achromatic colors from grayscale level 120 to grayscale level 255 (highest grayscale level) of the liquid crystal display device 100.

Next, the tendency when the grayscale level of each subpixel is increased or decreased will be described. FIG. 5 shows example of chromaticity points (xy chromaticity coordinates) of achromatic colors from grayscale level 120 to grayscale level 255 (highest grayscale level), in the case where the liquid crystal display device 100 has 256 grayscale levels.

As can be seen from FIG. 5, a chromaticity point of an achromatic color of grayscale level 120 differs from the chromaticity point of an achromatic color of the highest grayscale level. In order to allow them to match, it is necessary to shift the chromaticity point of the achromatic color of grayscale level 120 in the upper right direction (shown by an arrow) in FIG. 5.

Figure 6:
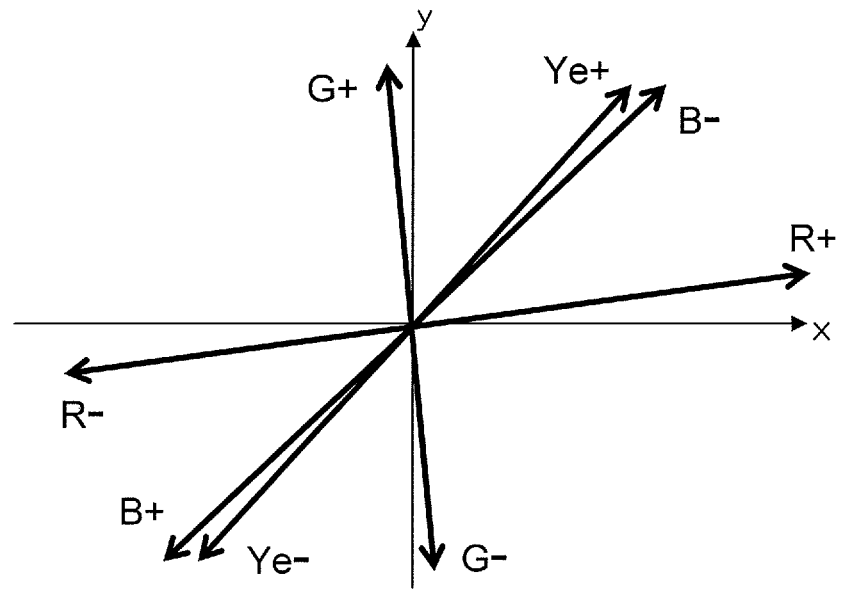
[FIG. 6] A graph schematically showing directions in which a chromaticity point may change when the grayscale levels of a red subpixel R, a green subpixel G, a blue subpixel B, and a yellow subpixel Ye are each increased or decreased, where the origin is defined at a chromaticity point of an achromatic color.

FIG. 6 schematically shows directions in which a chromaticity point may change when the grayscale levels of a red subpixel R, a green subpixel G, a blue subpixel B, and a yellow subpixel Ye are each increased or decreased, where the origin of the graph is defined at a chromaticity point of an achromatic color. In FIG. 6, "+" indicates increasing the grayscale level, whereas "−" indicates decreasing the grayscale level. For example, if the grayscale level of the red subpixel R is increased, the chromaticity point will change in the R+ direction; if the grayscale level of the red subpixel R is decreased, the chromaticity point will change in the R− direction.

As can be seen from FIG. 6, the direction of chromaticity change (B+ direction) when increasing the grayscale level of the blue subpixel B and the direction of chromaticity change (Ye− direction) when decreasing the grayscale level of the yellow subpixel Ye are substantially the same; and the direction of chromaticity change (B− direction) when decreasing the grayscale level of the blue subpixel B and the direction of chromaticity change (Ye+ direction) when increase the grayscale level of the yellow subpixel Ye are substantially the same. This is because the relationship between blue and yellow is that of complementary colors. Therefore, chromaticity changes along substantially the same axis when the grayscale level of blue is increased or decreased and when the grayscale level of yellow is increased or decreased. Therefore, when both blue and yellow are selected as the two colors whose grayscale levels are to be adjusted, it is difficult to match the chromaticity point of the chromaticity point of an achromatic color of an intermediate gray level with the chromaticity point of an achromatic color of the highest grayscale level. For this reason, it may be preferable to fix the grayscale level of one of the blue subpixel B and the yellow subpixel Ye (i.e., while adjust the grayscale level of the other), or the grayscale level of both are fixed (i.e., the grayscale level of neither is adjusted). However, as has already been described, it is preferable to fix the grayscale level of the yellow subpixel Ye from the standpoint of influences on luminance; therefore, the two prospective subpixels whose grayscale levels are to be adjusted may be a combination of the red subpixel R and the green subpixel G, a combination of the red subpixel R and the blue subpixel B, or a combination of the green subpixel G and the blue subpixel B.

Now, FIG. 5 will be referred to again. As shown in FIG. 5, in the xy chromaticity diagram, there is a tendency for the chromaticity point of an achromatic color of an intermediate gray level to deviate in an oblique direction from a target chromaticity point (the chromaticity point of an achromatic color of the highest grayscale level). Therefore, it will be more efficient to increase or decrease the grayscale level of the blue subpixel B or the yellow subpixel Ye, rather than the red subpixel R, whose direction of chromaticity change when its grayscale level increased or decreased is close to the horizontal direction, or the green subpixel G, that of which is close to the vertical direction.

Thus, by taking all of the above conditions into consideration, the two prospective subpixels whose grayscale levels are to be adjusted may be a combination of the red subpixel R and the blue subpixel B or a combination of the green subpixel G and the blue subpixel B. In other words, the second subpixel group is either composed of the blue subpixel B and the red subpixel R, or composed of the blue subpixel B and the green subpixel B.

As described above, by including the yellow subpixel Ye in the first subpixel group and including the blue subpixel B in the second subpixel group, it becomes possible to reduce influences on luminance, and efficiently apply a white point adjustment. Note that it is not necessary to apply white point adjustment at all gray levels. For example, at lower grayscale levels, the luminance that each subpixel can exhibit is in itself low (i.e., the grayscale level can only be increased or decreased in a narrow breadth); therefore, even if white point adjustment is applied, the chromaticity point may not be brought sufficiently close to the target chromaticity point. Moreover, at lower grayscale levels, there is little influence on image quality because of low luminance. Therefore, to begin with, there is no need to apply white point adjustment at intermediate gray levels corresponding to a normalized luminance 0.2 or less. However, from the standpoint of realizing adequate color management, among all gray levels, white point adjustment is preferably applied at intermediate gray levels of 60% or more, more preferably at intermediate gray levels of 80% or more, and still more preferably at intermediate gray levels of 85% or more.

Now, the criteria as to which one of the red subpixel R and the green subpixel G is to be selected as the subpixel other than the blue subpixel B composing the second subpixel group will be described.

In the case where an achromatic color of a given intermediate gray level is displayed by a pixel, the xy chromaticity coordinates of an achromatic color which is displayed by the pixel when assuming that display signals of the same grayscale level as the given intermediate gray level are supplied to all of the plurality of subpixels will be defined as a "reference chromaticity point (pre-adjustment chromaticity point)". At this time, the direction of chromaticity change when the grayscale level of the display signal supplied to the blue subpixel B is increased or decreased, i.e., the locus of the reference chromaticity point on the xy chromaticity diagram, will be referred to as a "B axis". The criteria as to which one of the red subpixel R and the green subpixel G is to be selected as the subpixel other than the blue subpixel B composing the second subpixel group may be whether the target chromaticity point (the xy chromaticity coordinates of an achromatic color of the highest grayscale level displayed by the pixel) is above the B axis (i.e., the G+ side) or below the B axis (i.e., the G− side) on the xy chromaticity diagram.

Figure 7:
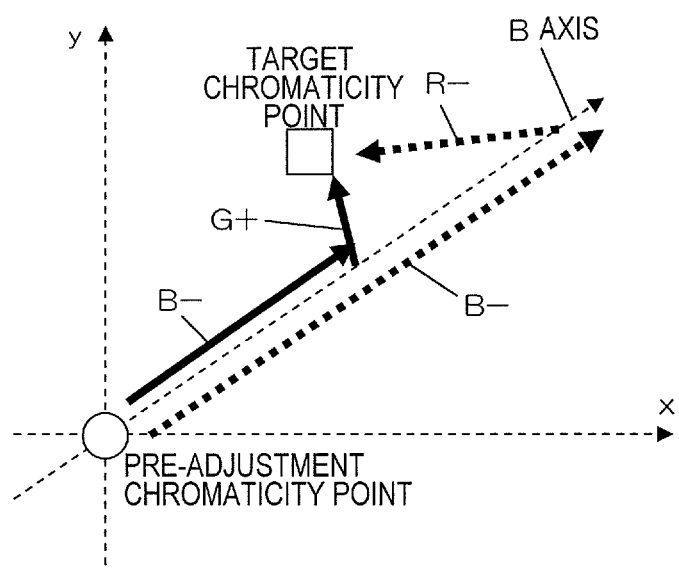
[FIG. 7] A diagram showing examples of white point adjustment in the case where a target chromaticity point is located on the G+ side of the B axis.

FIG. 7 shows examples of white point adjustment in the case where a target chromaticity point is located on the G+ side (upper side) of the B axis. In this case, if the blue subpixel B and the green subpixel G are selected as the second subpixel group, then the grayscale level of the blue subpixel B is to be decreased (the solid-line arrow B− in the figure), and also the grayscale level of the green subpixel G is to be increased (the solid-line arrow G+ in the figure). On the other hand, if the blue subpixel B and the red subpixel R are selected as the second subpixel group, then the grayscale level of the blue subpixel B is to be decreased (the dotted-line arrow B− in the figure), and also the grayscale level of the red subpixel R is to be decreased (the dotted-line arrow R− in the figure). Rather than decreasing the grayscale levels of both of the two subpixels of the second subpixel group (i.e., the latter adjustment), decreasing the grayscale level of one of the two subpixels of the second subpixel group while increasing the grayscale level of the other (i.e., the former adjustment) will incur a smaller decrease in luminance, which is preferable. Moreover, the former adjustment requires smaller amounts of adjustment than the latter adjustment, which is also preferable.

Thus, in the case where the target chromaticity point is located on the G+ side (upper side) of the B axis, from the standpoint of luminance change and amount of adjustment, it is preferable that the green subpixel G is included in the second subpixel group in addition to the blue subpixel B (i.e., the red subpixel R is included in the first subpixel group in addition to the yellow subpixel Ye). At this time, the display signal supplied from the driving circuit 20 to the blue subpixel B is a display signal of a lower grayscale level than the grayscale level of the display signals supplied to the yellow subpixel Ye and the red subpixel R. Moreover, the display signal supplied to the green subpixel G from the driving circuit 20 is a display signal of a higher grayscale level than the grayscale level of the display signals supplied to the yellow subpixel Ye and the red subpixel R.

Figure 8:
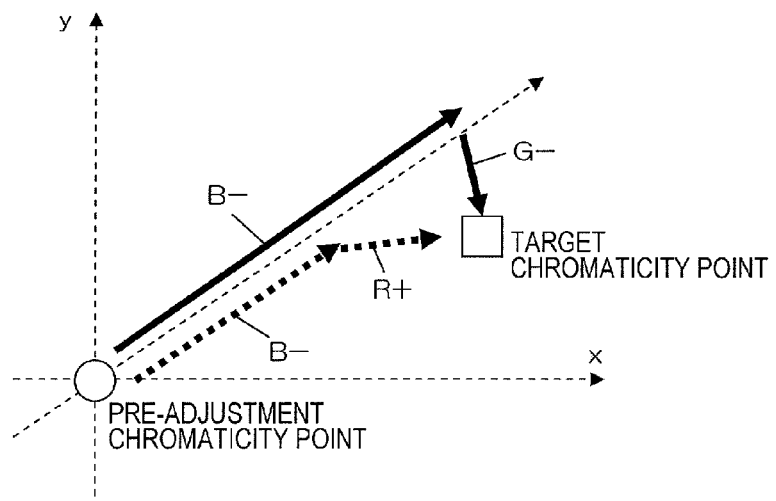
[FIG. 8] A diagram showing examples of white point adjustment in the case where a target chromaticity point is located on the G− side of the B axis.

FIG. 8 shows examples of white point adjustment in the case where a target chromaticity point is located on the G– side (lower side) of the B axis. In this case, if the blue subpixel B and the green subpixel G are selected as the second subpixel group, then the grayscale level of the blue subpixel B is to be decreased (the solid-line arrow B– in the figure), and also the grayscale level of the green subpixel G is to be decreased (the solid-line arrow G– in the figure). On the other hand, if the blue subpixel B and the red subpixel R are selected as the second subpixel group, then the grayscale level of the blue subpixel B is decreased (the dotted-line arrow B– in the figure), and also the grayscale level of the red subpixel R is to be increased (the dotted-line arrow R+ in the figure). Rather than decreasing the grayscale levels of both of the two subpixels of the second subpixel group (i.e., the former adjustment), decreasing the grayscale level of one of the two subpixels of the second subpixel group while increasing the grayscale level of the other (i.e., the latter adjustment) will incur a smaller decrease in luminance, which is preferable. Moreover, the latter adjustment requires smaller amounts of adjustment than the former adjustment, which is also preferable.

Thus, in the case where the target chromaticity point is located on the G– side (lower side) of the B axis, from the standpoint of luminance change and amount of adjustment, it is preferable that the red subpixel R is included in the second subpixel group in addition to the blue subpixel B (i.e., the green subpixel G is included in the first subpixel group in addition to the yellow subpixel Ye). At this time, the display signal supplied from the driving circuit 20 to the blue subpixel B is a display signal of a lower grayscale level than the grayscale level of the display signals supplied to the yellow subpixel Ye and the green subpixel G. Moreover, the display signal supplied from the driving circuit 20 to the red subpixel R is a display signal of a higher grayscale level than the grayscale level of the display signals supplied to the yellow subpixel Ye and the green subpixel G.

Note that the target chromaticity point may not always be located on the same side of the B axis for achromatic colors of all gray levels. In other words, depending on the specifications of the liquid crystal display device 100, the target chromaticity point may be located on the G+ side of the B axis for an achromatic color of an intermediate gray level, and the target chromaticity point may be located on the G– side of the B axis for an achromatic color of another intermediate gray level. In this case, for all of the intermediate gray levels to which white point adjustment is applied, the relative positioning between the target chromaticity point and the B axis may be determined, and the second subpixel group may be selected for each intermediate gray level. However, in order to facilitate white point adjustment, the same selection of the second subpixel group may be universally adopted for all of the intermediate gray levels to which white point adjustment is applied. For example, the relative positioning between the target chromaticity point and the B axis may be determined at a specific grayscale level (e.g., at grayscale level 120 shown in FIG. 5), and a second subpixel group may be selected based on this result. Alternatively, an average of deviation between the target chromaticity point and the B axis may be taken for all of the intermediate gray levels to which white point adjustment is applied, and a second subpixel group may be selected; or, the relative positioning between the target chromaticity point and the B axis may be determined for all of the intermediate gray levels to which white point adjustment is applied, and a second subpixel group may be selected according to the majority.

Next, results of verifying the white point adjustment technique of the present embodiment through calculations will be discussed.

First, it will be considered how the chromaticity point moves when the grayscale level of each primary color is changed (increased or decreased). Specifically, influences on the chromaticity point will be discussed based on the XYZ values of each chromaticity point. Assuming that changes in the chromaticity point are minute changes $\Delta x$ and $\Delta y$, then $\Delta x$ and $\Delta y$ are expressed by eqs. (1) and (2) below by using the XYZ values.

[math. 1]

$$\Delta x = \frac{X + \Delta X}{X + Y + Z + \Delta X + \Delta Y + \Delta Z} - \frac{X}{X + Y + Z} \quad (1)$$

$$= \frac{X + \Delta X}{X + Y + Z\left(1 + \frac{\Delta X + \Delta Y + \Delta Z}{X + Y + Z}\right)} - \frac{X}{X + Y + Z}$$

$$\cong \frac{X + \Delta X}{X + Y + Z}\left(1 - \frac{\Delta X + \Delta Y + \Delta Z}{X + Y + Z}\right) - \frac{X}{X + Y + Z}$$

$$= \frac{1}{(X + Y + Z)^2}[(X + Y + Z)\Delta X - (\Delta X + \Delta Y + \Delta Z)X]$$

[math. 2]

$$\Delta y = \frac{Y + \Delta Y}{X + Y + Z + \Delta X + \Delta Y + \Delta Z} - \frac{Y}{X + Y + Z} \quad (2)$$

$$= \frac{Y + \Delta Y}{X + Y + Z\left(1 + \frac{\Delta X + \Delta Y + \Delta Z}{X + Y + Z}\right)} - \frac{Y}{X + Y + Z}$$

$$\cong \frac{Y + \Delta Y}{X + Y + Z}\left(1 - \frac{\Delta X + \Delta Y + \Delta Z}{X + Y + Z}\right) - \frac{Y}{X + Y + Z}$$

$$= \frac{1}{(X + Y + Z)^2}[(X + Y + Z)\Delta Y - (\Delta X + \Delta Y + \Delta Z)Y]$$

Now, the chromaticity point of an achromatic color which is displayed when the grayscale levels of all primary colors are made equal (i.e., an achromatic color prior to white point adjustment) at an arbitrary intermediate gray level will be considered. Assuming XYZ values $(X_R, Y_R, Z_R)$ for red, XYZ values $(X_G, Y_G, Z_G)$ for green, XYZ values $(X_B, Y_B, Z_B)$ for blue, and XYZ values $(X_Y, Y_Y, Z_Y)$ for yellow at an arbitrary intermediate gray level, and a normalized luminance K of an achromatic color at the arbitrary intermediate gray level, then the XYZ values $(X_0, Y_0, Z_0)$ of the chromaticity point of the achromatic color prior to white point adjustment is expressed by eqs. (3), (4), and (5) below.

$$X_0 = K(X_R + X_G + X_B + X_Y) \quad (3)$$

$$Y_0 = K(Y_R + Y_G + Y_B + Y_Y) \quad (4)$$

$$Z_0 = K(Z_R + Z_G + Z_B + Z_Y) \quad (5)$$

By denoting $(X_R + X_G + X_B + X_Y)$ as $X_{RGBY}$, $(Y_R + Y_G + Y_B + Y_Y)$ as $Y_{RGBY}$, and $(Z_R + Z_G + Z_B + Z_Y)$ as $Z_{RGBY}$, eqs. (3)', (4)', and (5)' below are derived from eqs. (3), (4), and (5) above.

$$X_0 = KX_{RGBY} \quad (3)'$$

$$Y_0 = KY_{RGBY} \quad (4)'$$

$$Z_0 = KZ_{RGBY} \quad (5)'$$

Now, if the grayscale level of red is increased so that red has a normalized luminance of K+k, then the X value will be $X_1 = X_0 + kX_R$. Therefore, the change in the X value is expressed as $\Delta X = X_1 - X_0 = kX_R$. Similarly, the change $\Delta Y$ in the Y value is expressed as $\Delta Y = kY_R$, and the change $\Delta Z$ in the Z value is expressed as $\Delta Z = kZ_R$. Therefore, a gradient $\Delta y/\Delta x$ of the minute changes is expressed by eq. (6) below.

[math. 3]

$$\frac{\Delta y}{\Delta x} = \frac{k(X_0 + Y_0 + Z_0)Y_R - k(X_R + Y_R + Z_R)Y_0}{k(X_0 + Y_0 + Z_0)X_R - k(X_R + Y_R + Z_R)X_0} \quad (6)$$

$$= \frac{K(X_{RGBY} + Y_{RGBY} + Z_{RGBY})Y_R - K(X_R + Y_R + Z_R)Y_{RGBY}}{K(X_{RGBY} + Y_{RGBY} + Z_{RGBY})X_R - K(X_R + Y_R + Z_R)X_{RGBY}}$$

$$= \frac{(X_{RGBY} + Y_{RGBY} + Z_{RGBY})Y_R - (X_R + Y_R + Z_R)Y_{RGBY}}{(X_{RGBY} + Y_{RGBY} + Z_{RGBY})X_R - (X_R + Y_R + Z_R)X_{RGBY}}$$

It is assumed that: the chromaticity point of the achromatic color prior to white point adjustment has a deviation ($\Delta X_{mix}$, $\Delta Y_{mix}$) from the target chromaticity point; and, for the two colors whose grayscale levels are selected for adjustment, the minute increases or decreases ($\Delta x$, $\Delta y$) in chromaticity caused by increasing or decreasing their grayscale levels are ($k_x$, $k_y$), ($l_x$, $l_y$), respectively. If the chromaticity point of the achromatic color is to be matched to the target chromaticity point by increasing or decreasing the first color by a rate of $\alpha$, and the second color by a rate of $\beta$, then eq. (7) below holds.

[math. 4]

$$(\Delta x_{mix}, \Delta y_{mix}) = (\alpha, \beta) \begin{pmatrix} k_x & k_y \\ l_x & l_y \end{pmatrix} \quad (7)$$

From eq. (7) above, $\alpha$ and $\beta$ are expressed by eqs. (8) and (9) below. However, in eqs. (8) and (9), $k = k_y/k_x$, $l = l_y/l_x$.

[math. 5]

$$\alpha = \frac{1}{k_x}\left(\frac{l\Delta x - \Delta y}{l - k}\right) \quad (8)$$

[math. 6]

$$\beta = \frac{1}{l_x}\left(\frac{-k\Delta x + \Delta y}{l - k}\right) \quad (9)$$

In the manner described above, the rates ($\alpha$, $\beta$) by which the two colors for adjustment are to be changed, so that the chromaticity point of an achromatic color of an intermediate gray level is matched to the target chromaticity point, are calculated.

Hereinafter, results of verifying the white point adjustment technique by calculating the aforementioned rates ($\alpha$, $\beta$) for a three-primary liquid crystal display device and the liquid crystal display device 100 of the present embodiment will be described.

Table 3 shows $\alpha$ and $\beta$, in a three-primary liquid crystal display device of specifications as shown in Table 1, for matching the chromaticity point of an achromatic color of grayscale level 120 (x, y)=(0.2569, 0.2497) to the chromaticity point (x, y)=(0.2803, 0.2827) of an achromatic color of the highest grayscale level. Table 3 illustrates rates $\alpha$ and $\beta$ by which the two primary colors are to be changed, a gross change, and a target luminance error, with respect to the three cases where the two primary colors for adjustment are red and green, red and blue, or green and blue. A gross change is a measure of the amounts of change for two colors, as represented by $(\alpha^2+\beta^2)^{1/2}$. A target luminance error is a luminance difference between the unadjusted achromatic color and the adjusted achromatic color.

TABLE 3

| primary colors for adjustment | α | β | gross change | target luminance error |
|---|---|---|---|---|
| red · green | 0.027648 | 0.024925 | 0.037224 | 0.022262 |
| red · blue | 0.002724 | −0.02492 | 0.025073 | 0.013245 |
| green · blue | −0.00272 | −0.02765 | 0.027782 | 0.055752 |

It can be seen from Table 3 that, in terms of gross change and target luminance error, it is most preferable to adjust the grayscale levels of red and blue while fixing the grayscale level of green, as has been conventionally done.

Figure 9:
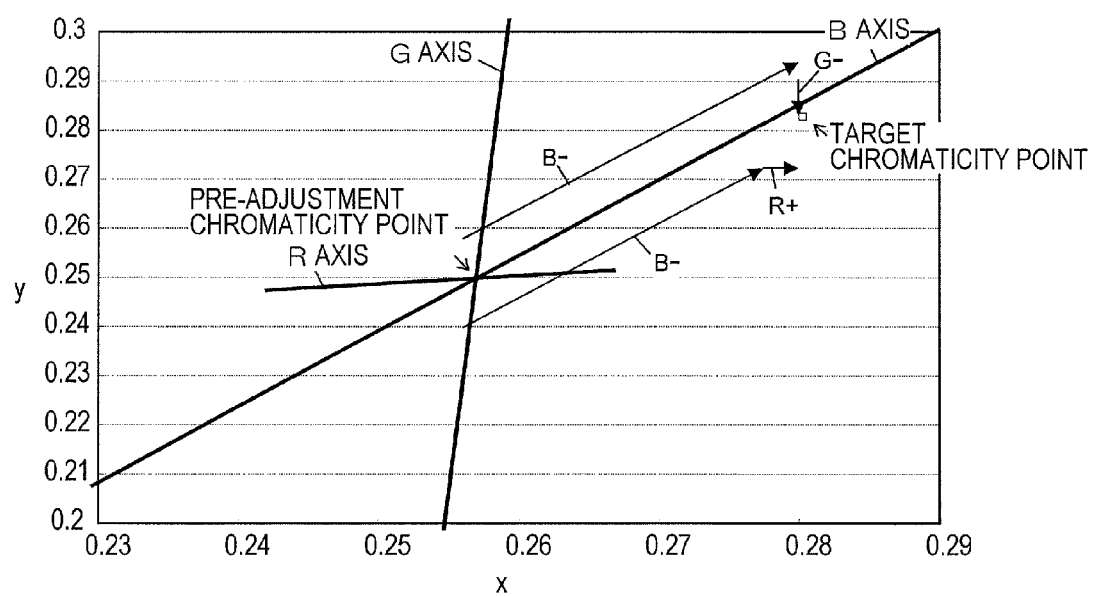
[FIG. 9] An xy chromaticity diagram showing a chromaticity point prior to white point adjustment (a chromaticity point of an achromatic color of grayscale level 120) and a target chromaticity point (a chromaticity point of an achromatic color of grayscale level 255) in a three-primary liquid crystal display device.

FIG. 9 shows a chromaticity point prior to white point adjustment (the chromaticity point of an achromatic color of grayscale level 120) and a target chromaticity point (the chromaticity point of an achromatic color of grayscale level 255) in this three-primary liquid crystal display device. The graph of FIG. 9 shows, in addition to the B axis representing a direction of chromaticity change when the grayscale level of blue is increased or decreased, an R axis representing a direction of chromaticity change when the grayscale level of red is increased or decreased and a G axis representing a direction of chromaticity change when the grayscale level of green is increased or decreased.

As shown in FIG. 9, when the two primary colors for adjustment are green and blue, the adjustments for the two colors will both involve decreasing the grayscale level. On the other hand, when the two primary colors for adjustment are red and blue, the adjustments will involve decreasing the grayscale level for blue but increasing the grayscale level for red. Thus, it can also be seen from FIG. 9 that it is preferable to adjust the grayscale levels of red and blue.

Table 4 shows $\alpha$ and $\beta$, in the liquid crystal display device 100 of specifications as shown in Table 2, for matching the chromaticity point of an achromatic color of grayscale level 120 (x, y)=(0.2345, 0.2147) to the chromaticity point (x, y)=(0.2694, 0.2858) of an achromatic color of the highest grayscale level. Table 4 illustrates rates $\alpha$ and $\beta$ by which the two primary colors are to be changed, a gross change, and a target luminance error, with respect to the six cases where the two primary colors for adjustment are red and green, red and blue, red and yellow, green and blue, green and yellow, or blue and yellow.

TABLE 4

| primary colors for adjustment | α | β | gross change | target luminance error |
|---|---|---|---|---|
| red · green | 0.077225 | 0.101614 | 0.127629 | 0.044444 |
| red · blue | −0.01452 | −0.04995 | 0.052021 | −0.00825 |
| red · yellow | −0.00497 | 0.098257 | 0.098383 | 0.039048 |
| green · blue | 0.016081 | −0.04205 | 0.045018 | 8.63E−05 |

TABLE 4-continued

| primary colors for adjustment | α | β | gross change | target luminance error |
|---|---|---|---|---|
| green · yellow | 0.006149 | 0.092311 | 0.092516 | 0.039375 |
| blue · yellow | 0.026034 | 0.149466 | 0.151716 | 0.0637 |

It can be seen from Table 4 that, in terms of gross change and target luminance error, it is most preferable to adjust the grayscale levels of green and blue while fixing the grayscale levels of yellow and red. It can also be seen from Table 4 that adjusting the grayscale level of yellow will not provide favorable results in terms of either gross change or target luminance error.

Figure 10:
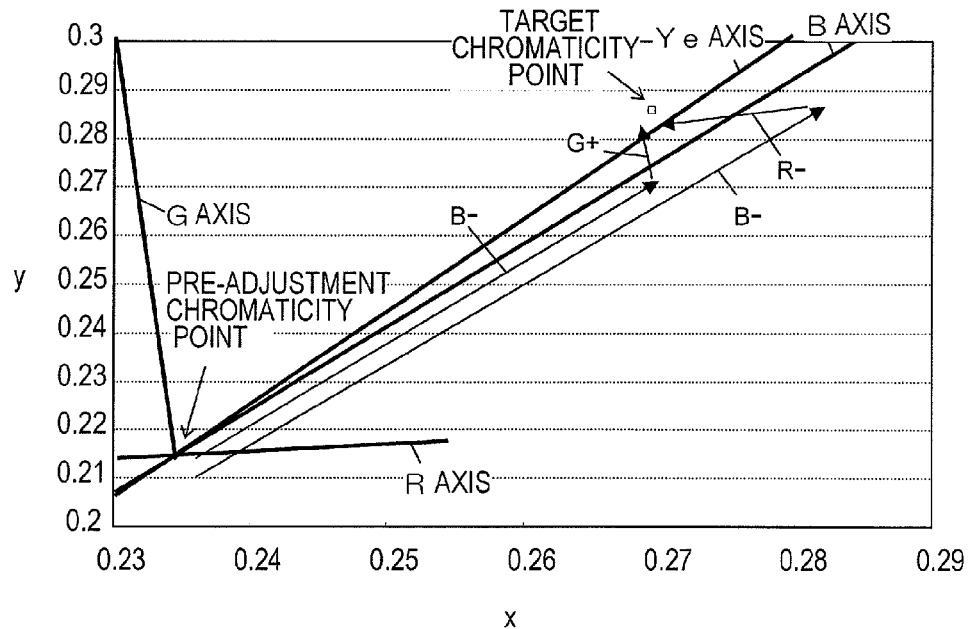
[FIG. 10] An xy chromaticity diagram showing a chromaticity point prior to white point adjustment (a chromaticity point of an achromatic color of grayscale level 120) and a target chromaticity point (a chromaticity point of an achromatic color of grayscale level 255) in the liquid crystal display device 100.

FIG. 10 shows a chromaticity point prior to white point adjustment (the chromaticity point of an achromatic color of grayscale level 120) and a target chromaticity point (the chromaticity point of an achromatic color of grayscale level 255) in the liquid crystal display device 100 of the above specifications. The graph of FIG. 10 shows, in addition to the B axis, the R axis, and the G axis, a Ye axis representing a direction of chromaticity change when the grayscale level of yellow is increased or decreased.

As shown in FIG. 10, when the two primary colors for adjustment are red and blue, the adjustments for the two colors will both involve decreasing the grayscale level. On the other hand, when the two primary colors for adjustment are green and blue, the adjustments will involve decreasing the grayscale level for blue but increasing the grayscale level for green. Thus, it can also be seen from FIG. 10 that it is preferable to adjust the grayscale levels of green and blue.

Figure 11:
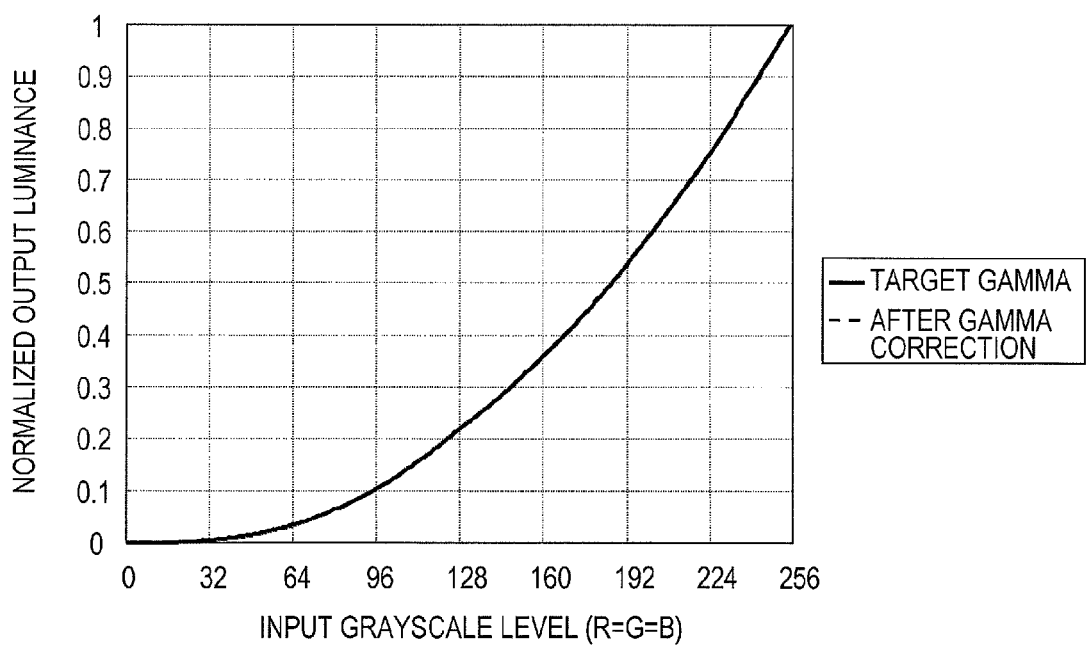
[FIG. 11] A graph showing a relationship, in the liquid crystal display device 100, between an input grayscale level (R=G=B) and a normalized output luminance of an achromatic color which is displayed by a pixel, in a state prior to white point adjustment.

FIG. 11 shows a relationship, in the liquid crystal display device 100 of the above specifications in a state prior to white point adjustment, between an input grayscale level (R=G=B) and a normalized output luminance of an achromatic color which is displayed by a pixel. As shown in FIG. 11, the normalized output luminance after gamma correction matches the target gamma.

Figure 12:
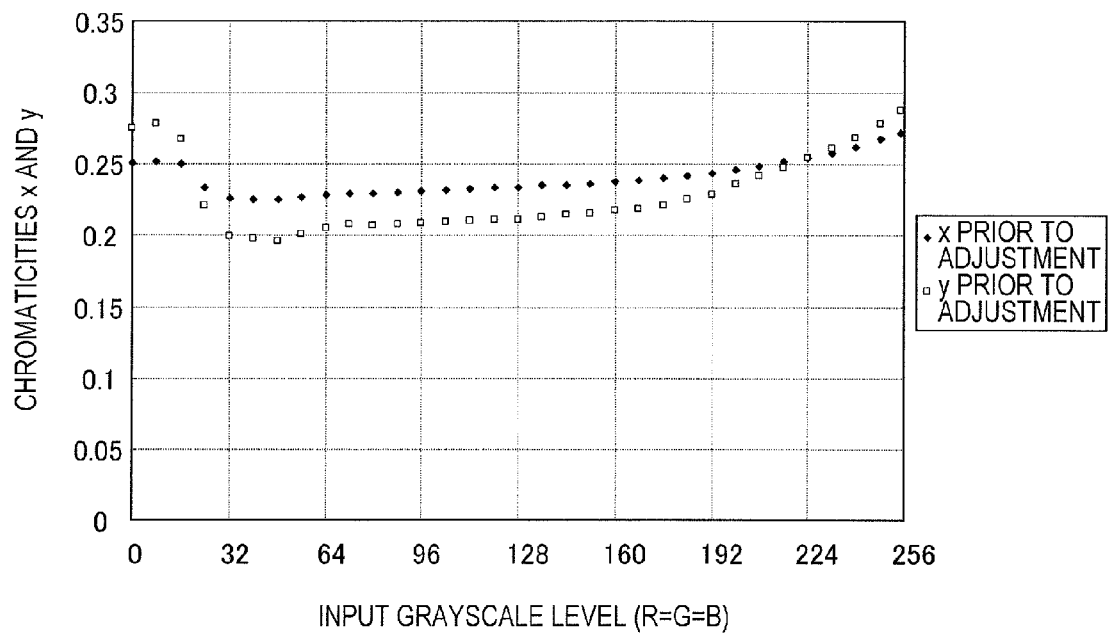
[FIG. 12] A graph showing a relationship, in the liquid crystal display device 100 in a state prior to white point adjustment, between an input grayscale level (R=G=B) and chromaticities x and y of an achromatic color which is displayed by a pixel.

FIG. 12 shows a relationship, in the liquid crystal display device 100 of the above specifications in a state prior to white point adjustment, between an input grayscale level (R=G=B) and chromaticities x and y of an achromatic color which is displayed by a pixel. It can be seen from FIG. 12 that the chromaticities x and y of an achromatic color of an intermediate gray level are deviated from the chromaticities x and y of an achromatic color of the highest grayscale level.

Figure 13:
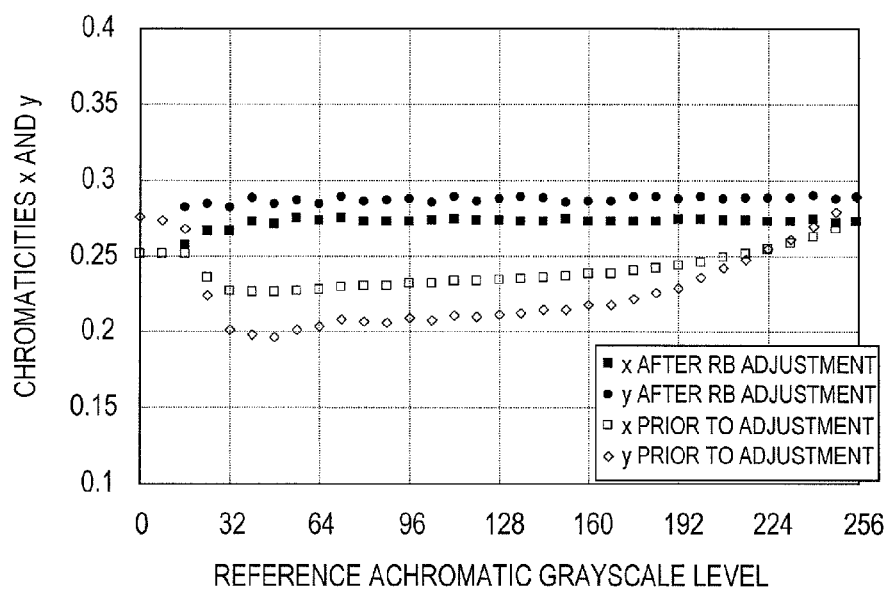
[FIG. 13] A graph showing a relationship, in the liquid crystal display device 100 after a white point adjustment is applied by changing the grayscale levels for red and blue, between a grayscale level of an achromatic color serving as a reference and chromaticities x and y of an achromatic color which is displayed by a pixel.

FIG. 13 shows a relationship, in the liquid crystal display device 100 of the above specifications after a white point adjustment is applied by changing the grayscale levels for red and blue, between a grayscale level of an achromatic color serving as a reference and chromaticities x and y of an achromatic color which is displayed by a pixel. For comparison sake, FIG. 13 also shows the chromaticities x and y prior to white point adjustment.

It can be seen from FIG. 13 that the white point adjustment has allowed the chromaticities x and y of the achromatic color of an intermediate gray level to substantially match the chromaticities x and y of the achromatic color of the highest grayscale level. However, as has been described with reference to FIG. 10, when the grayscale levels of red and blue are changed under these specifications, the grayscale levels of red and blue are both to be decreased.

Figure 14:
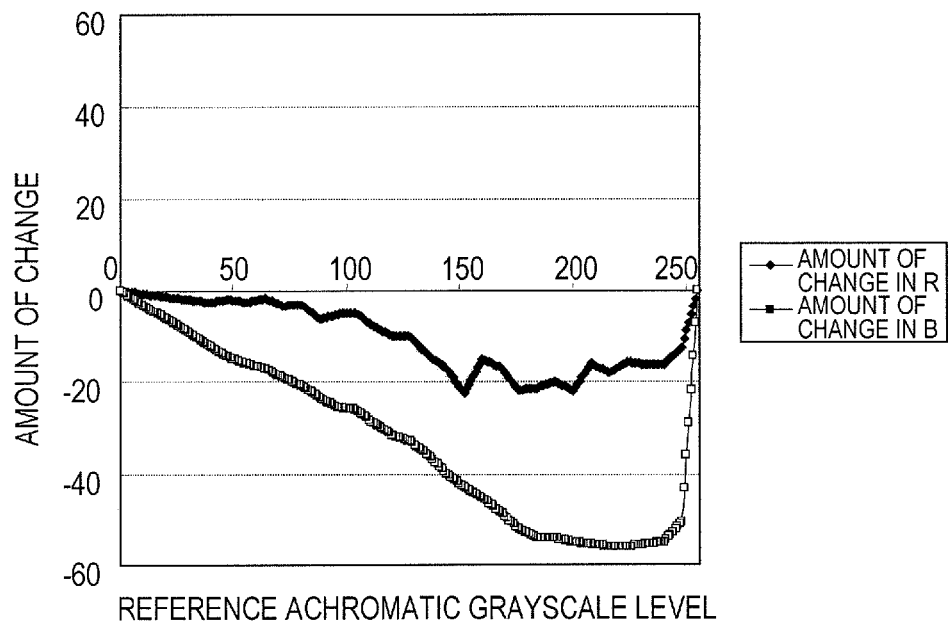
[FIG. 14] A graph showing a relationship, in the liquid crystal display device 100, between a grayscale level of an achromatic color serving as a reference and amounts of change in the grayscale levels for red and blue.

FIG. 14 shows a relationship between a grayscale level of an achromatic color serving as a reference and amounts of change in the grayscale levels for red and blue. As indicated in FIG. 14, the amount of change in the grayscale level is negative for both of red and blue, and thus the grayscale levels of red and blue are both decreased. Therefore, when white point adjustment is applied by changing the grayscale levels of red and blue, an achromatic color of an intermediate gray level will decrease in luminance.

Figure 15:
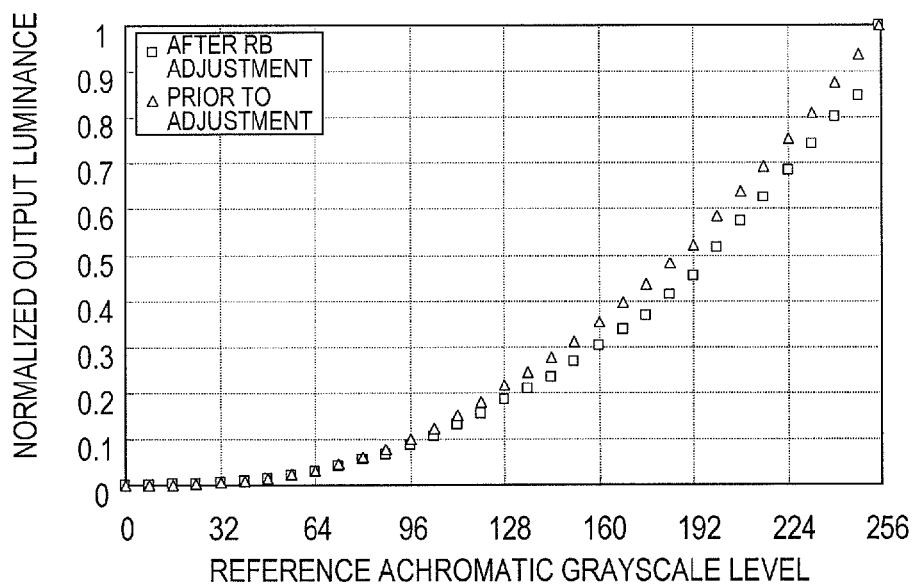
[FIG. 15] A graph showing a relationship, in the liquid crystal display device 100 before and after a white point adjustment is applied by changing the grayscale levels for red and blue, between a grayscale level of an achromatic color serving as a reference and a normalized output luminance of an achromatic color which is displayed by a pixel.

FIG. 15 shows a relationship, before and after a white point adjustment is applied by changing the grayscale levels for red and blue, between a grayscale level of an achromatic color serving as a reference and a normalized output luminance of an achromatic color which is displayed by a pixel. As can be seen from FIG. 15, the luminance after white point adjustment is reduced from the luminance prior to white point adjustment.

Figure 16:
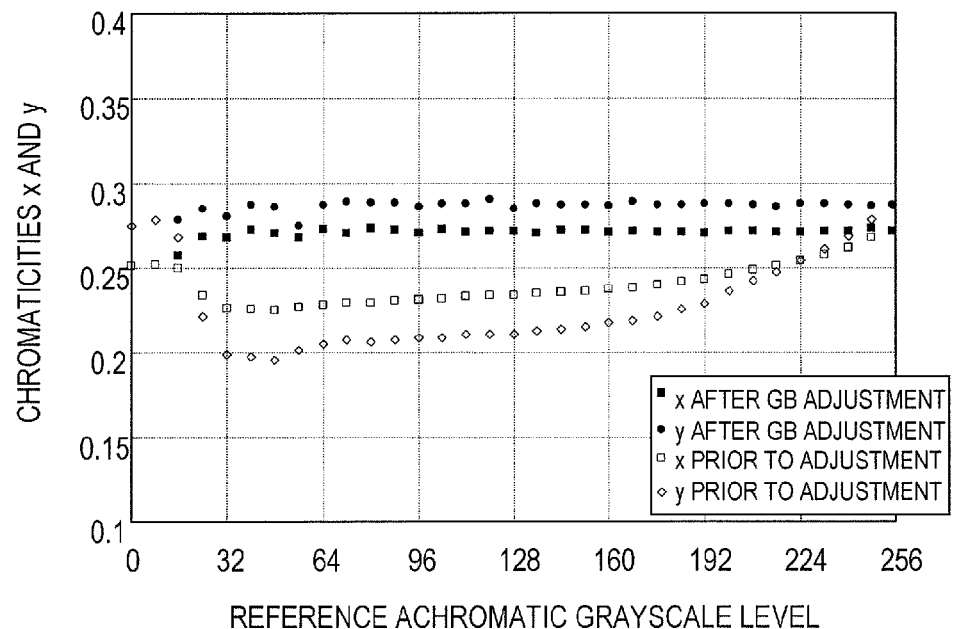
[FIG. 16] A graph showing a relationship, in the liquid crystal display device 100 after a white point adjustment is applied by changing the grayscale levels for green and blue, between a grayscale level of an achromatic color serving as a reference and chromaticities x and y of an achromatic color which is displayed by a pixel.

FIG. 16 shows a relationship, in the liquid crystal display device 100 under these specifications after a white point adjustment is applied by changing the grayscale levels for green and blue, between a grayscale level of an achromatic color serving as a reference and chromaticities x and y of an achromatic color which is displayed by a pixel. For comparison sake, FIG. 16 also shows the chromaticities x and y prior to white point adjustment.

It can be seen from FIG. 16 that the white point adjustment has allowed the chromaticities x and y of the achromatic color of an intermediate gray level to substantially match the chromaticities x and y of the achromatic color of the highest grayscale level. Moreover, as has been described with reference to FIG. 10, when the grayscale levels of green and blue are changed under these specifications, the grayscale level of blue is to be decreased, but the grayscale level of green is to be increased.

Figure 17:
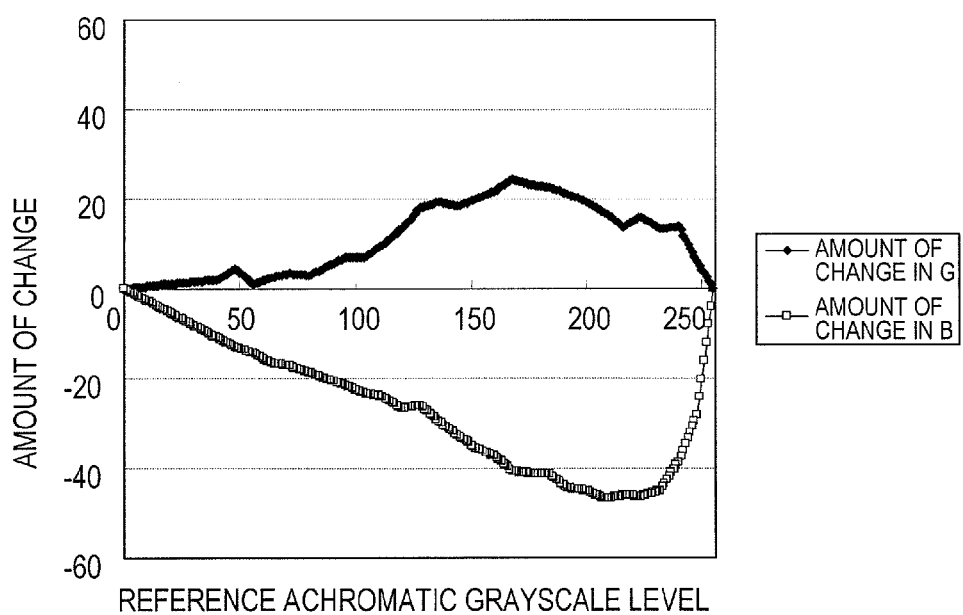
[FIG. 17] A graph showing a relationship, in the liquid crystal display device 100, between a grayscale level of an achromatic color serving as a reference and amounts of change in the grayscale levels for green and blue.

FIG. 17 shows a relationship between a grayscale level of an achromatic color serving as a reference and amounts of change in the grayscale levels for green and blue. As is indicated in FIG. 17, the amount of change in the grayscale level is negative for blue, but the amount of change in the grayscale level is positive for green, and thus the grayscale level of blue is decreased, but the grayscale level of green is increased. Therefore, when white point adjustment is applied by changing the grayscale levels of green and blue, decrease in the luminance of an achromatic color of an intermediate gray level can be suppressed.

Figure 18:
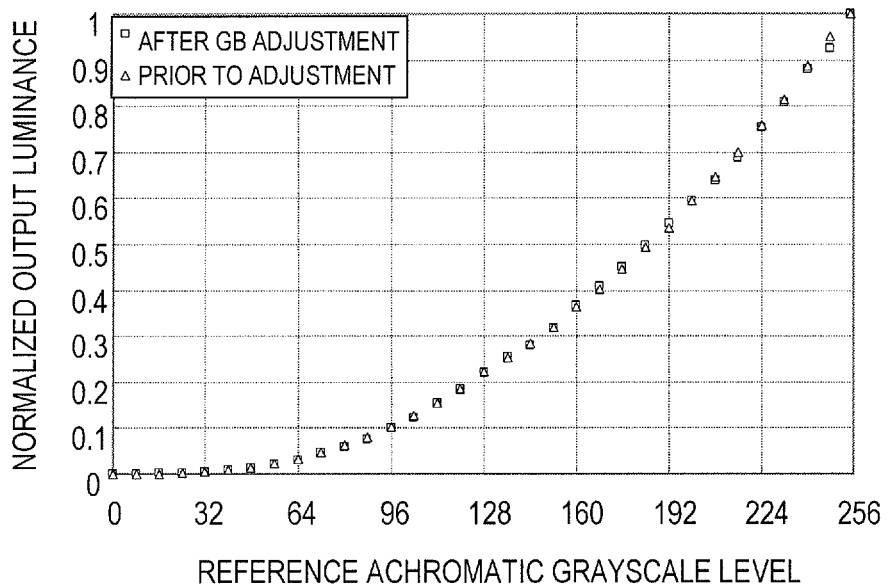
[FIG. 18] A graph showing a relationship, in the liquid crystal display device 100 before and after a white point adjustment is applied by changing the grayscale levels for green and blue, between a grayscale level of an achromatic color serving as a reference and a normalized output luminance of an achromatic color which is displayed by a pixel.

FIG. 18 shows a relationship, before and after a white point adjustment is applied by changing the grayscale levels for green and blue, between a grayscale level of an achromatic color serving as a reference and a normalized output luminance of an achromatic color which is displayed by a pixel. As can be seen from FIG. 18, the luminance after white point adjustment is hardly changed from the luminance prior to white point adjustment.

Up to here, results of verification in the case where the liquid crystal display device 100 has specifications as shown in Table 2 have been described. Next, results of verification in the case where the liquid crystal display device 100 has specifications as shown in Table 5 will be described.

TABLE 5

|  | X | Y | Z |
|---|---|---|---|
| R | 0.2335 | 0.1230 | 0.0063 |
| G | 0.1404 | 0.3372 | 0.0464 |
| B | 0.3436 | 0.1264 | 1.8283 |
| Ye | 0.2863 | 0.4134 | 0.0301 |

Table 6 shows α and β, in the liquid crystal display device 100 of specifications as shown in Table 5, for matching the chromaticity point of an achromatic color of grayscale level 120 (x, y)=(0.248, 0.251) to the chromaticity point (x, y)= (0.2583, 0.2582) of an achromatic color of the highest grayscale level. Table 6 illustrates rates α and β by which the two primary colors are to be changed, a gross change, and a target luminance error, with respect to the six cases where the two primary colors for adjustment are red and green, red and blue, red and yellow, green and blue, green and yellow, or blue and yellow.

TABLE 6

| primary colors for adjustment | α | β | gross change | target luminance error |
|---|---|---|---|---|
| red · green | 0.02102 | 0.008201 | 0.022563 | 0.00544 |
| red · blue | 0.014591 | −0.00329 | 0.014958 | 0.001405 |
| red · yellow | 0.015684 | 0.00802 | 0.017616 | 0.005204 |
| green · blue | −0.01861 | −0.01076 | 0.0215 | −0.00775 |
| green · yellow | −0.02411 | 0.031592 | 0.039739 | 0.004508 |
| blue · yellow | −0.04723 | −0.10701 | 0.116972 | −0.04929 |

It can be seen from Table 6 that, in terms of gross change and target luminance error, it is most preferable to adjust the grayscale levels of red and blue while fixing the grayscale levels of yellow and green. It can also be seen from Table 6 that adjusting the grayscale level of yellow will not provide favorable results in terms of either gross change or target luminance error.

Figure 19:
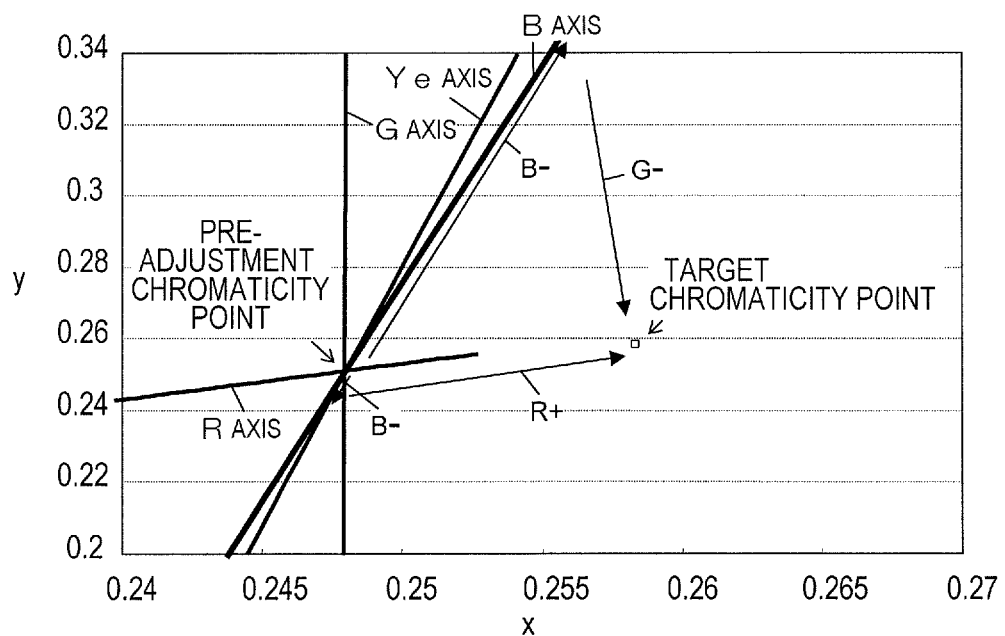
[FIG. 19] An xy chromaticity diagram showing a chromaticity point prior to white point adjustment a chromaticity point of an achromatic color of grayscale level 120) and a target chromaticity point (a chromaticity point of an achromatic color of grayscale level 255) in the liquid crystal display device 100.

FIG. 19 shows a chromaticity point prior to white point adjustment (the chromaticity point of an achromatic color of grayscale level 120) and a target chromaticity point (the chromaticity point of an achromatic color of grayscale level 255) in the liquid crystal display device 100 of the above specifications.

As is shown in FIG. 19, when the two primary colors for adjustment are green and blue, the adjustments for the two colors will both involve decreasing the grayscale level. On the other hand, when the two primary colors for adjustment are red and blue, the adjustments will involve decreasing the grayscale level for blue but increasing the grayscale level for red. Thus, it can also be seen from FIG. 19 that it is preferable to adjust the grayscale levels of red and blue.

Figure 20:
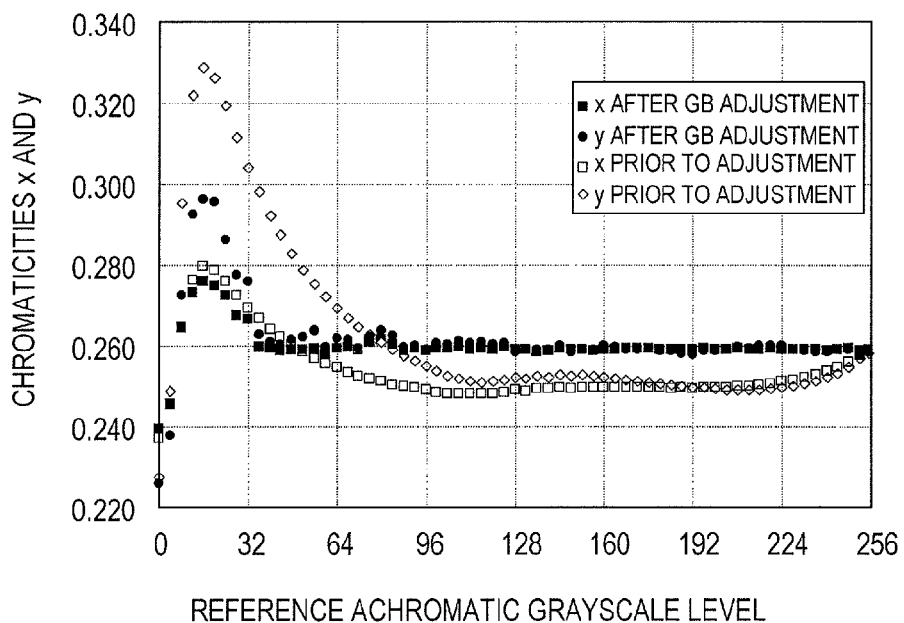
[FIG. 20] A graph showing a relationship, in the liquid crystal display device 100 after a white point adjustment is applied by changing the grayscale levels for green and blue, between a grayscale level of an achromatic color serving as a reference and chromaticities x and y of an achromatic color which is displayed by a pixel.

FIG. 20 shows a relationship, in the liquid crystal display device 100 under these specifications after a white point adjustment is applied by changing the grayscale levels for green and blue, between a grayscale level of an achromatic color serving as a reference and chromaticities x and y of an achromatic color which is displayed by a pixel. For comparison sake, FIG. 20 also shows the chromaticities x and y prior to white point adjustment.

It can be seen from FIG. 20 that the white point adjustment has allowed the chromaticities x and y of the achromatic color of an intermediate gray level to substantially match the chromaticities x and y of the achromatic color of the highest grayscale level. However, as has been described with reference to FIG. 19, when the grayscale levels of green and blue are changed under these specifications, the grayscale levels of green and blue are both to be decreased.

Figure 21:
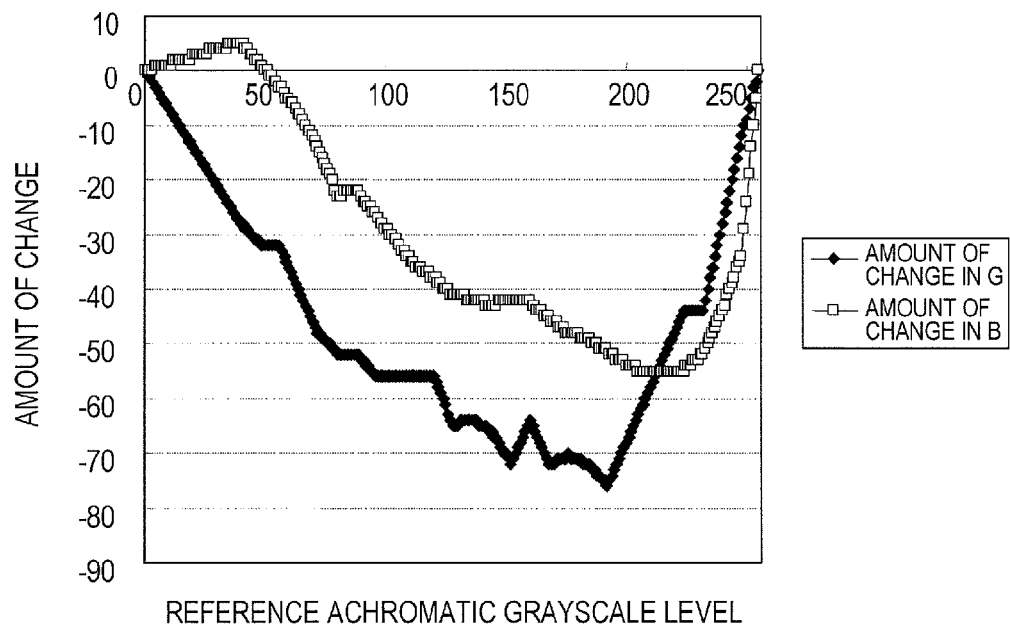
[FIG. 21] A graph showing a relationship, in the liquid crystal display device 100, between a grayscale level of an achromatic color serving as a reference and amounts of change in the grayscale levels for green and blue.

FIG. 21 shows a relationship between a grayscale level of an achromatic color serving as a reference and amounts of change in the grayscale levels for green and blue. As shown in FIG. 21, the amount of change in the grayscale level is generally negative for both green and blue, and thus the grayscale levels of green and blue are both decreased. Therefore, when white point adjustment is applied by changing the grayscale levels of green and blue, an achromatic color of an intermediate gray level will decrease in luminance.

Figure 22:
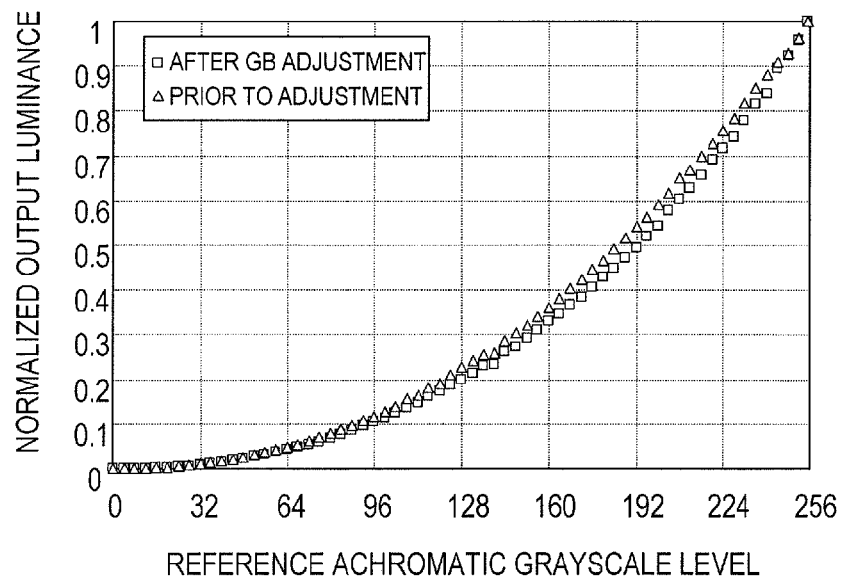
[FIG. 22] A graph showing a relationship, in the liquid crystal display device 100 before and after a white point adjustment is applied by changing the grayscale levels for green and blue, between a grayscale level of an achromatic color serving as a reference and a normalized output luminance of an achromatic color which is displayed by a pixel.

FIG. 22 shows a relationship, before and after a white point adjustment is applied by changing the grayscale levels for green and blue, between a grayscale level of an achromatic color serving as a reference and a normalized output luminance of an achromatic color which is displayed by a pixel. As can be seen from FIG. 22, the luminance after white point adjustment is reduced from the luminance prior to white point adjustment.

Figure 23:
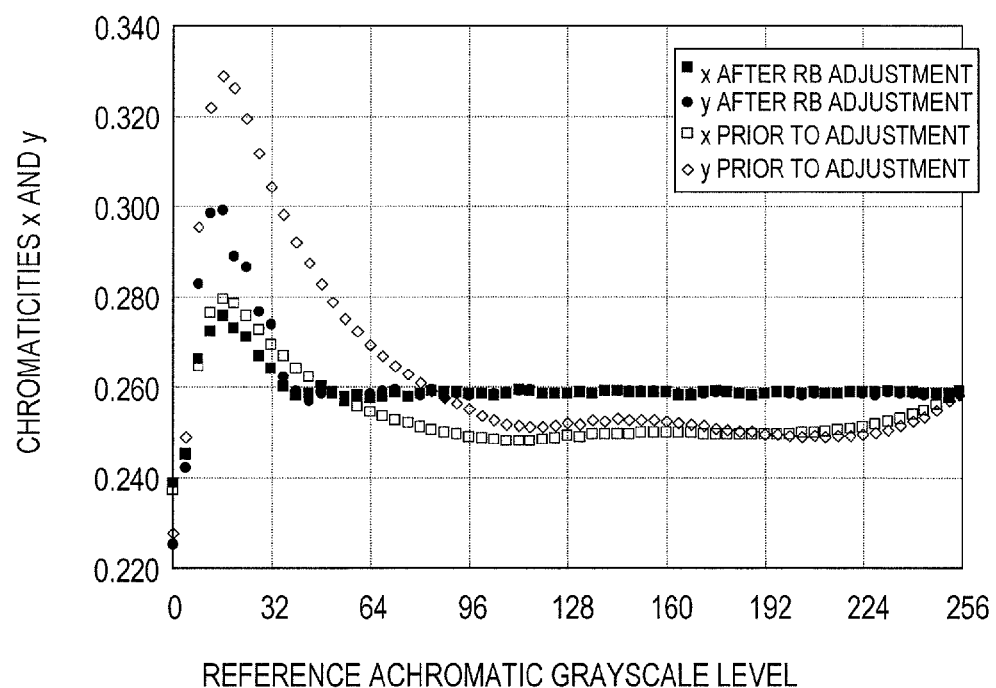
[FIG. 23] A graph showing a relationship, in the liquid crystal display device 100 after a white point adjustment is applied by changing the grayscale levels for red and blue, between a grayscale level of an achromatic color serving as a reference and chromaticities x and y of an achromatic color which is displayed by a pixel.

FIG. 23 shows a relationship, in the liquid crystal display device 100 of the above specifications after a white point adjustment is applied by changing the grayscale levels for red and blue, between a grayscale level of an achromatic color serving as a reference and chromaticities x and y of an achromatic color which is displayed by a pixel. For comparison's sake, FIG. 23 also shows the chromaticities x and y prior to white point adjustment.

It can be seen from FIG. 23 that the white point adjustment has allowed the chromaticities x and y of the achromatic color of an intermediate gray level to substantially match the chromaticities x and y of the achromatic color of the highest grayscale level. Moreover, as has been described with reference to FIG. 19, when the grayscale levels of red and blue are changed under these specifications, the grayscale level is decreased for blue, but the grayscale level is increased for red.

Figure 24:
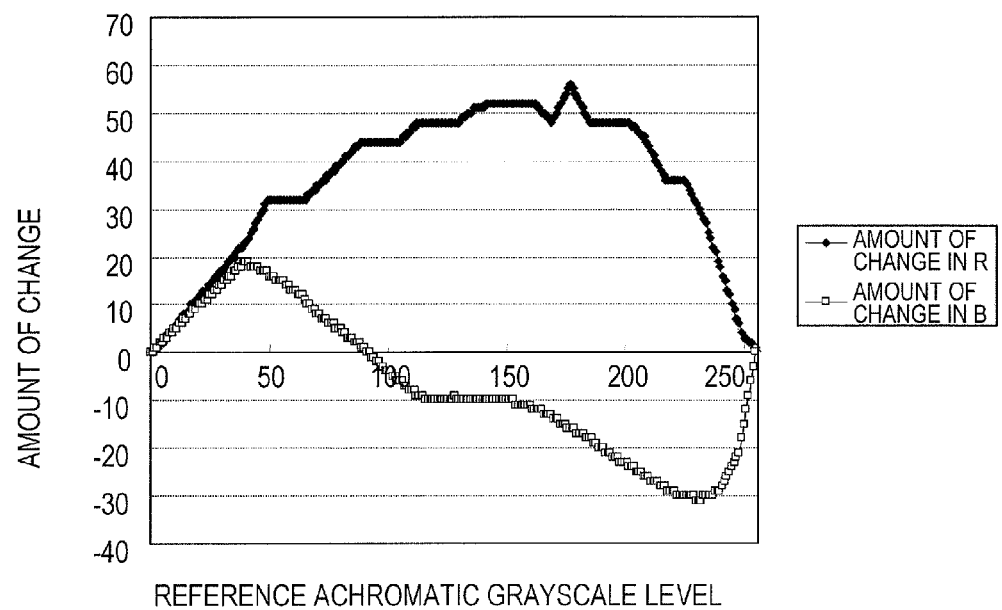
[FIG. 24] A graph showing a relationship, in the liquid crystal display device 100, between a grayscale level of an achromatic color serving as a reference and amounts of change in the grayscale levels for red and blue.

FIG. 24 shows a relationship between a grayscale level of an achromatic color serving as a reference and amounts of change in the grayscale levels for red and blue. As is indicated in FIG. 24, the amount of change in the grayscale level is negative for blue except at lower grayscale levels, but the amount of change in the grayscale level is positive for red, and thus the grayscale level of blue is generally decreased, but the grayscale level of red is increased. Therefore, when white point adjustment is applied by changing the grayscale levels of red and blue, decrease in the luminance of an achromatic color of an intermediate gray level can be suppressed.

Figure 25:
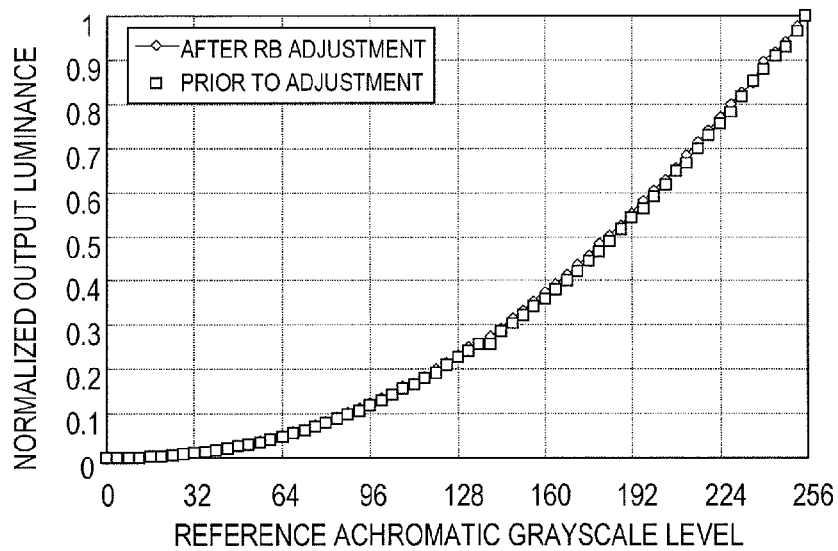
[FIG. 25] A graph showing a relationship, in the liquid crystal display device 100 before and after a white point adjustment is applied by changing the grayscale levels for red and blue, between a grayscale level of an achromatic color serving as a reference and a normalized output luminance of an achromatic color which is displayed by a pixel.

FIG. 25 shows a relationship, before and after a white point adjustment is applied by changing the grayscale levels for red and blue, between a grayscale level of an achromatic color serving as a reference and a normalized output luminance of an achromatic color which is displayed by a pixel. As can be seen from FIG. 25, the luminance after white point adjustment is hardly changed from the luminance prior to white point adjustment.

Figure 26:
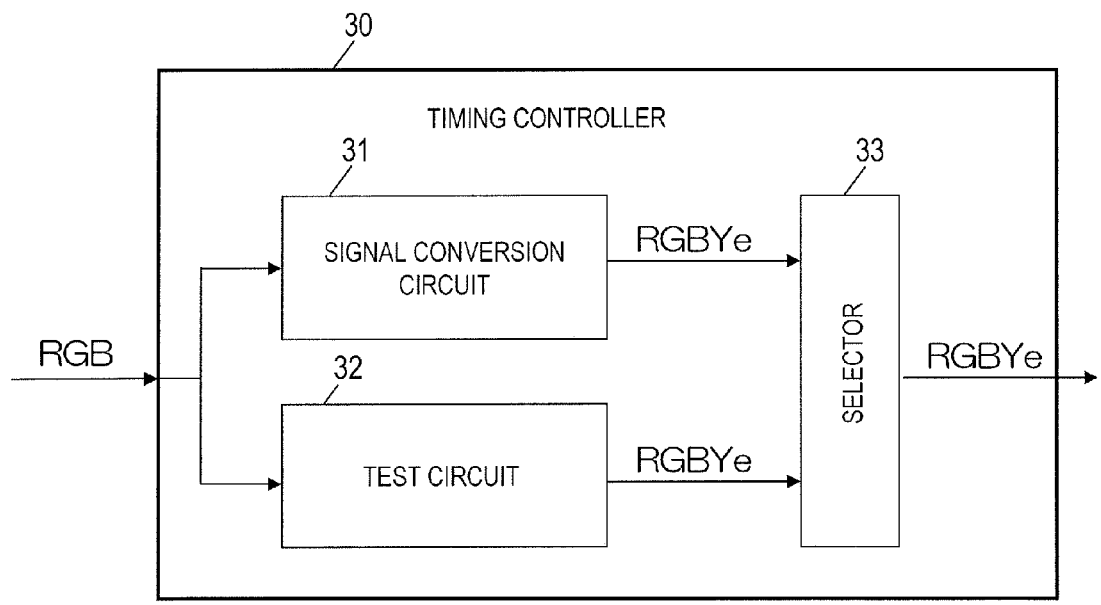
[FIG. 26] A block diagram showing a specific exemplary construction of a timing controller 30 included in a driving circuit 20 of the liquid crystal display device 100.

Next, a specific construction of the timing controller 30 included in the driving circuit 20 of the liquid crystal display device 100 of the present embodiment will be described. FIG. 26 shows a suitable construction for the timing controller 30.

The timing controller 30 shown in FIG. 26 includes a signal conversion circuit 31 that converts an image signal corresponding to three primary colors into a multiprimary signal corresponding to four primary colors, a test circuit 32 to conduct a white point adjustment, and a selector 33 for switching between the signal from the signal conversion circuit 31 and the signal from the test circuit 32 for being output to the liquid crystal display panel 10.

Figure 27:
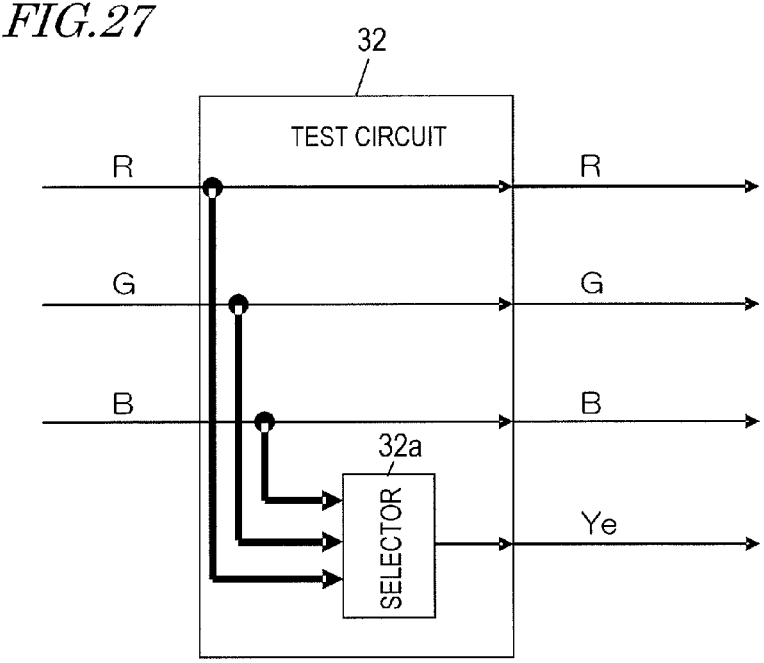
[FIG. 27] A block diagram showing a specific exemplary construction of a test circuit 32 included in the timing controller 30.

The specific construction of the test circuit 32 is shown in FIG. 27. As for red, green, and blue, the test circuit 32 outputs signals of the same grayscale levels as the red component, green component, and blue component of an input image signal. Moreover, the test circuit 32 has a selector 32a in its interior, and as for the remaining yellow, outputs a signal of the same grayscale level as one of the red component, green component, and blue component of the input image signal. Therefore, if an image signal is input such that the grayscale levels of the red component, green component, and blue component are all A, for example, then the grayscale levels of red, green, blue, and yellow are all A, regardless of which component is selected by the selector 32a. As a result, an achromatic color at the grayscale level A, which serves as a reference prior to adjustment, is obtained.

Now, a deviation between the chromaticity point of the resultant achromatic color of the grayscale level A and the chromaticity point of an achromatic color of the maximum grayscale level (which is grayscale level 255 in the case of 8 bits) is adjusted for. For example, in the case where adjustment is made based on green and blue, the grayscale levels of red and yellow are fixed. As the selectors 32a selects the red component, the grayscale level of red and the grayscale level of yellow will become A. As for green and blue, by first beginning at the grayscale level A, adjustments to the desired chromaticity point may be made by respectively increasing or decreasing them.

The result of white point adjustment using the test circuit 32 is fed back to the signal conversion circuit 31, whereby the signal conversion circuit 31 is enabled to conduct a signal conversion such that there is little difference between the chromaticity point of an achromatic color of an intermediate gray level and the chromaticity point of an achromatic color of the highest grayscale level. As the signal conversion circuit 31, any known circuit that has been proposed for use with multiprimary liquid crystal display devices can be used.

Although an example where an image signal corresponding to three primaries is externally input to the driving circuit 20 is illustrated herein, the present invention is not limited thereto. A multiprimary signal corresponding to four primary colors may be input to the driving circuit 20. In that case, the timing controller 30 does not need to include the signal conversion circuit 31 and the test circuit 32.

Industrial Applicability

According to the present invention, a white point adjustment technique which is suitably used for a multiprimary liquid crystal display device that performs multicolor display by using four primary colors is provided.

REFERENCE SIGNS LIST 10 liquid crystal display panel
20 driving circuit
30 timing controller
31 signal conversion circuit
32 test circuit
32a selector
33 selector
40 LCD driver
41 gate driver
42 source driver
100 liquid crystal display device
R red subpixel
G green subpixel
B blue subpixel
Ye yellow subpixel

The invention claimed is:

1. A liquid crystal display device comprising:
a liquid crystal display panel including a pixel defined by a plurality of subpixels; and
a driving circuit configured to supply display signals to the plurality of subpixels of the pixel; wherein
the plurality of subpixels include a red subpixel, a green subpixel, a blue subpixel, and a yellow subpixel;
in the pixel, the plurality of subpixels are divided into:
a first subpixel group including the yellow subpixel and the green subpixel; and
a second subpixel group including the blue subpixel and the red subpixel; and
in the pixel, to display achromatic colors having at least some grayscale levels among all grayscale levels, the driving circuit is configured to supply:
to the yellow subpixels and the green subpixel of the first subpixel group, display signals of a same grayscale level; and
to the subpixels of the second subpixel group:
to the blue subpixel, a display signal having a lower grayscale level than the grayscale level of the display signals supplied to the yellow subpixel and the green subpixel of the first subpixel group; and
to the red subpixel, a display signal having a higher grayscale level than the gayscale level of the display signals supplied to the yellow subpixel and the green subpixel of the first subpixei group.

2. The liquid crystal display device of claim 1, wherein the at least some grayscale levels are intermediate grayscale levels of 60% or more among all grayscale levels.

3. The liquid crystal display device of claim 1, wherein the at least some grayscale levels do not include any intermediate grayscale levels corresponding to a normalized luminance of 0.2 or less.

4. The liquid crystal display device of claim 1, wherein the driving circuit is configured to supply driving signals to the first subpixel group having the same grayscale level as the grayscale level of an achromatic color displayed by the pixel.

5. The liquid crystal display device of claim 1, wherein,
the liquid crystal display panel includes a plurality of scanning lines and a plurality of signal lines; and
the driving circuit includes a gate driver electrically connected to the plurality of scanning lines, a source driver electrically connected to the plurality of signal lines, and a timing controller that supplies predetermined signals to the gate driver and the source driver.

6. The liquid crystal display device of claim 5, wherein the timing controller includes a signal conversion circuit that converts an image signal corresponding to three primary colors into a multiprimary signal corresponding to four primary colors.

7. The liquid crystal display device of claim 6, wherein the timing controller further includes a test circuit to conduct a white point adjustment.

8. The liquid crystal display device of claim 1, wherein the driving circuit is configured to supply the display signals to the first subpixel group and the second subpixel group such that, for the pixel, a chromaticity of achromatic colors having at least some intermediate grayscale levels matches a chromaticity of an achromatic color having the highest grayscale level.

9. A liquid crystal display device comprising:
a liquid crystal display panel including a pixel defined by a plurality of subpixels; and
a driving circuit configured to supply display signals to the plurality of subpixels of the pixel; wherein
the plurality of subpixels include a red subpixel, a green subpixel, a blue subpixel, and a yellow subpixel;
in the pixel, the plurality of subpixels are divided into:
a first subpixel group including the yellow subpixel and one of the red subpixel and the green subpixel; and
a second subpixel group including the blue subpixel and the other of the red subpixel and the green subpixel; and
in the pixel, to display achromatic colors having at least some grayscale levels among all grayscale levels, the driving circuit is configured to supply:
to the subpixels of the first subpixel group, display signals of a same grayscale level; and to the subpixels of the second subpixel group, display signals of a different grayscale level from the grayscale level of the display signals supplied to the first subpixel group;

with respect to an achromatic color of a given intermediate grayscale level among the at least some grayscale levels being displayed by the pixel, xy chromaticity coordinates of an achromatic color displayed by the pixel when assuming that display signals of the same grayscale level as the given intermediate grayscale level are supplied to all of the plurality of subpixels is defined as a reference chromaticity point; xy chromaticity coordinates of an achromatic color of a highest grayscale level displayed by the pixel is defined as a target chromaticity point; and a locus of the reference chromaticity point on an xy chromaticity diagram when the grayscale level of the display signal supplied to the blue subpixel is increased or decreased is defined as a B axis;

when the target chromaticity point is located above the B axis on the xy chromaticity diagram, the first subpixel group includes the yellow subpixel and the red subpixel, the second subpixel group includes the blue subpixel and the green subpixel, the driving circuit supplies a driving signal to the blue subpixel having a lower grayscale level than the grayscale level of the display signals supplied to the yellow subpixel and the red subpixel, and the driving circuit supplies a driving signal to the green subpixel having a higher grayscale level than the grayscale level of the display signals supplied to the yellow subpixel and the red subpixel; and when the target chromaticity point is located below the B axis on the xy chromaticity diagram, the first subpixel group includes the yellow subpixel and the green subpixel, the second subpixel group includes the blue subpixel and the red subpixel, the driving circuit supplies a drive signal to the blue subpixel having a lower grayscale level than the grayscale level of the display signals supplied to the yellow subpixel and the green subpixel, and the driving circuit supplies a driving signal to the red subpixel having a higher grayscale level than the grayscale level of the display signals supplied to the yellow subpixel and the green subpixel.

10. A signal conversion circuit for use in a liquid crystal display device to convert an image signal corresponding to three primary colors into a multiprimary signal corresponding to four primary colors, the liquid crystal display device including a pixel which is defined by a red subpixel, a green subpixel, a blue subpixel, and a yellow subpixel; wherein in the pixel, the subpixels are divided into:
a first subpixel group including the yellow subpixel and the green subpixel; and
a second subpixel group including the blue subpixel and the red subpixel;

in the pixel, to display achromatic colors of at least some grayscale levels among all grayscale levels, the signal conversion circuit is configured to convert the image signal so that:
the yellow subpixel and the green subpixel of the first subpixel group displays at a same grayscale level;
the blue subpixel of the second subpixel group displays at a lower grayscale level than the grayscale level of the yellow subpixel and the green subpixel of the first subpixel group, and
the red subpixel of the second subpixel group displays at a higher grayscale level than The grayscale level of the yellow subpixel and the green subpixel of the first subpixel group.

11. The signal conversion circuit of claim 10, wherein, for the pixel, a chromaticity of achromatic colors having at least some intermediate grayscale levels matches a chromaticity of an achromatic color having the highest grayscale level.

* * * * *